US011734883B2

(12) United States Patent
Eckman et al.

(10) Patent No.: US 11,734,883 B2
(45) Date of Patent: Aug. 22, 2023

(54) GENERATING MAPPINGS OF PHYSICAL SPACES FROM POINT CLOUD DATA

(71) Applicant: Lineage Logistics, LLC, Irvine, CA (US)

(72) Inventors: Christopher Frank Eckman, San Francisco, CA (US); Brady Michael Lowe, Pocatello, ID (US)

(73) Assignee: Lineage Logistics, LLC, Irvine, CA (US)

( * ) Notice: Subject to any disclaimer, the term of this patent is extended or adjusted under 35 U.S.C. 154(b) by 123 days.

(21) Appl. No.: 17/230,651

(22) Filed: Apr. 14, 2021

(65) Prior Publication Data

US 2022/0335688 A1  Oct. 20, 2022

(51) Int. Cl.
*G06T 17/05* (2011.01)
*G06V 20/10* (2022.01)
*G06F 18/23* (2023.01)
*G06F 18/2431* (2023.01)

(52) U.S. Cl.
CPC ............ *G06T 17/05* (2013.01); *G06F 18/23* (2023.01); *G06F 18/2431* (2023.01); *G06V 20/176* (2022.01); *G06T 2210/12* (2013.01)

(58) Field of Classification Search
CPC ... G06T 17/05; G06T 2210/12; G06K 9/6218; G06K 9/628; G06V 20/176; G01C 21/3826; G01C 21/38
See application file for complete search history.

(56) References Cited

U.S. PATENT DOCUMENTS

| | | | |
|---|---|---|---|
| 11,176,693 B1 * | 11/2021 | Gonzalez-Nicolas | ........................ G06V 10/82 |
| 2013/0202197 A1 * | 8/2013 | Reeler | ..................... G06T 15/20 382/154 |
| 2017/0316253 A1 * | 11/2017 | Phillips | ................... G06V 20/56 |
| 2018/0304468 A1 * | 10/2018 | Holz | ....................... B66F 9/063 |
| 2018/0315209 A1 * | 11/2018 | Murphy-Chutorian | ........................ G06T 7/579 |
| 2019/0213530 A1 * | 7/2019 | Wolf | ..................... G06Q 10/043 |
| 2020/0043186 A1 * | 2/2020 | Selviah | .............. G06V 10/7515 |

(Continued)

OTHER PUBLICATIONS

International Search Report and Written Opinion in International Appln. No. PCT/US2022/024715, dated Aug. 5, 2022, 15 pages.

(Continued)

*Primary Examiner* — Sing-Wai Wu
*Assistant Examiner* — Khoa Vu
(74) *Attorney, Agent, or Firm* — Barnes & Thornburg LLP

(57) ABSTRACT

This specification describes systems and methods for generating a mapping of a physical space from point cloud data for the physical space. The methods can include receiving the point cloud data for the physical space, filtering the point cloud data to, at least, remove sparse points from the point cloud data, aligning the point cloud data along x, y, and z dimensions that correspond to an orientation of the physical space, and classifying the points in the point cloud data as corresponding to one or more types of physical surfaces. The methods can also include identifying specific physical structures in the physical space based, at least in part, on classifications for the points in the point cloud data, and generating the mapping of the physical space to identify the specific physical structures and corresponding contours for the specific physical structures within the orientation of the physical space.

20 Claims, 21 Drawing Sheets

(56) References Cited

U.S. PATENT DOCUMENTS

2021/0086370 A1\* 3/2021 Zhang .................... B25J 9/0084
2021/0225090 A1\* 7/2021 Tang ....................... G06T 19/00
2021/0349468 A1\* 11/2021 Bukhari ............... G06V 10/763

OTHER PUBLICATIONS

Kang et al.,"Voxel-Based Extraction and Classification of 3-D Pole-Like Objects From Mobile LiDAR Point Cloud Data," IEEE Journal of Selected Topics in Applied Earth Observations and Remote Sensing, Nov. 2018, 11(11):4287-4298.

Thomas et al., "Self-Supervised Learning of Lidar Segmentation for Autonomous Indoor Navigation," Arxiv.org, Cornell University Library, Dec. 10, 2020.

Yang et al., "A Skeleton-Based Hierarchical Method for Detecting 3-D Pole-Like Objects From Mobile LiDAR Point Clouds," IEEE Geoscience and Remote Sensing Letters, May 2019, 16(5): 801-805.

\* cited by examiner

GENERATING MAPPINGS OF PHYSICAL SPACES FROM POINT CLOUD DATA

TECHNICAL FIELD

This document generally describes using point clouds to generate mappings of a physical space, such as generating blueprints.

BACKGROUND

Physical spaces, such as warehouses and storage facilities, can be large and challenging to navigate. Mapping such physical spaces can assist users, such as warehouse workers, to learn a floorplan of a physical space and to move around that physical space without getting lost. Generating a blueprint or map of a physical space can be performed by users walking around the physical space with a scanner to acquire 3D scans and/or images of the entire physical space. The 3D scans and/or images can then be manually transformed into blueprints or maps of the physical space. Such blueprints or maps can be manually updated by users whenever changes are made to the physical space.

Manual mapping can be a time-consuming process and can include inaccuracies due to human error. For example, a user may not acquire images of every region of the physical space. Thus, a map can include certain regions of the physical space but not others. As another example, a user may not acquire updated images of regions of the physical space where changes are made. Thus, the map can be outdated and the users can be relying on the outdated map. Modern day blueprints and maps of physical spaces can be inaccurate, lacking detail, or missing all together. In addition, such blueprints and maps of physical spaces may not be readily updated to reflect daily changes in the actual physical space because of the amount of time and human power that is required to generate the blueprints and maps.

SUMMARY

This document generally describes computer-based technology and methods for generating mappings of physical spaces, such as blueprints, using point cloud data. A physical space mapping can include, for example, a collection of nodes and vertices in 3D space that define contours of physical objects, such as buildings, land features, shelves, pallets, vehicles, and other physical objects. As noted above, physical mappings have been traditionally generated using scanning techniques, such as LIDAR and other scanning technologies, which transmit signals out toward physical objects and record the signals as they are reflected by those objects to determine their contours. Scanning techniques can be time intensive and expensive to administer, which can hamper their use. Point clouds, on the other hand, can be generated using image analysis (e.g., stereoscopic image analysis), which can be generated from using cameras. The cameras can be more ubiquitous and inexpensive in comparison to scanning technologies such as LIDAR. Point cloud data can include, for example, points in 3D space that correspond to a feature of a physical object, such as an edge, a surface, a corner, and/or other physical feature. Although point clouds can generate noise, filtering techniques can be applied to the point clouds to more accurately discern the contours of physical objects.

The disclosed technology can leverage benefits of using point cloud data to determine mappings of physical objects and/or spaces by a variety of techniques described throughout this document. Benefits of point cloud data include that implementation can be less expensive than traditional mapping techniques described above, point cloud data can be dynamically generated, and mappings made from point cloud data can be dynamically updated. Moreover, the disclosed technology can make sense of disparate point cloud data so that physical objects and their contours can be readily identified from a mere collection of points.

The disclosed technology can provide for receiving 3D scans and/or images from one or more different types of devices in a physical space. In some implementations, the physical space can be a warehouse. The physical space can also be any type of storage facility, building, house, other structure, or outdoor environment, such as a section of a town and/or some other environment that can be surveyed. Using the 3D scans and/or images, the disclosed technology can generate, using point clouds, an accurate representation of the physical space, including but not limited to the physical space's footprint (e.g., blueprint, map, floorplan, etc.), cubic footage, wall positions, rack positions, aisles, hallways, etc. Point cloud data can also be used to determine coordinates and orientations of items within the physical space, such as rack positions and rack shelves in a warehouse environment. Additionally, the disclosed technology can provide for dynamically updating or otherwise renewing blueprints and mappings of the physical space in real-time, periodically, and/or automatically.

Particular embodiments described herein include systems and methods for generating a mapping of a physical space from point cloud data for the physical space. The embodiments can include receiving, by a computing system, the point cloud data for the physical space, the point cloud data including a plurality of points in three-dimensional space that approximate locations of physical surfaces within the physical space, and filtering the point cloud data to, at least, remove sparse points from the point cloud data. The embodiments can include aligning the point cloud data along x, y, and z dimensions that correspond to an orientation of the physical space, classifying the points in the point cloud data as corresponding to one or more types of physical surfaces, identifying specific physical structures in the physical space based, at least in part, on classifications for the points in the point cloud data, and generating the mapping of the physical space to identify the specific physical structures and corresponding contours for the specific physical structures within the orientation of the physical space.

In some implementations, the embodiments can optionally include one or more of the following features. For example, classifying the points in the point cloud data can include selecting, from the point cloud data, a reference point, identifying, for the reference point, k nearest neighbor points, calculating, for each of the k nearest neighbor points, spherical coordinates with respect to the reference point, determining, based on the spherical coordinates for each of the k nearest neighbor points, spherical features of the reference point, and classifying, based on determining the spherical features of the reference point, the reference point. The reference point can be classified as belonging to at least one of a floor, a wall, a vertical pole, a support beam, a pallet, and noise. Moreover, classifying the points in the point cloud data can further include outputting at least one of (i) classifications for each of the points in the point cloud data, (ii) spherical features for each of the points in the point cloud data, and (iii) objects that are represented by the point cloud data based on the classifications for each of the points in the point cloud data.

As another example, aligning the point cloud data can include identifying one or more reference points around at least one of a door or a window in the physical space. The one or more reference points indicate an axis on which to rotate the point cloud data. Aligning the point cloud data can also include detecting a bounding box around the physical space. The bounding box can indicate an axis on which to rotate the point cloud data.

In some implementations, the embodiments can also include detecting, from the point cloud data, vertical poles, detecting, from the point cloud data and based on the detected vertical poles, rack sections, determining pallet footprints based on the detected rack sections, determining heights of each shelf section in the detected rack sections, and identifying pallet locations for each shelf section of the detected rack sections based on the pallet footprints and the heights of each shelf section. Moreover, detecting vertical poles can include classifying points in the point cloud data that are associated with vertical poles, localizing the classified points, and straightening the localized points into vertical poles. Additionally, detecting rack sections can include clustering the vertical poles into rack groupings, classifying the clustered vertical poles with a rack type and a rack orientation, interpolating missing rack poles for each of the clustered vertical poles based on the classifying the clustered vertical poles with a rack type and a rack orientation, and detecting rack sections based on the clustered vertical poles.

In some implementations, classifying points in the point cloud data that are associated with vertical poles can include voxelizing the point cloud data into first predetermined mesh sizes, for each voxel, clustering points of the point cloud data in the voxel, for each cluster of points in the voxel, voxelizing the cluster of points into second predetermined mesh sizes, for each point in each voxelized cluster of points, classifying the point as a vertical pole point, for each cluster of points in the voxel, normalizing the classifications for each point, and determining, based on the normalizing the classifications for each point, whether each cluster of points in the voxel is associated with vertical poles.

For each point in each voxelized cluster of points, classifying the point as a vertical pole point can also include applying a covariance matrix to the voxelized cluster of points, determining standard deviation values for each point in the voxelized cluster of points, identifying a high standard deviation in a Z direction, identifying a low standard deviation in X and Y directions, and assigning, for each point in the voxelized cluster of points and based on the identified high standard deviation and the identified low standard deviation, a score for one dimensional or two dimensional points extension to the point.

In some implementations, for each point in each voxelized cluster of points, classifying the point as a vertical pole point can include applying a spherical covariance matric to the voxelized cluster of points. Classifying the point as a vertical pole point can also include applying a histogram filter to the voxelized cluster of points. Classifying the point as a vertical pole point can also include applying a neural network to the voxelized cluster of points.

As another example, clustering the vertical poles into rack groupings can include receiving rack information, and for each cluster, determining size information of the cluster. The size information can include a bounding box, minimum x, Y, and Z coordinates of the bounding box, and maximum X, Y, and Z coordinates of the bounding box. Clustering the vertical poles can include determining whether the size information of the cluster is consistent with the rank information, returning, based on determining that the size information of the cluster is not consistent with the rack information, points in the cluster to a pool of points in the point cloud data, identifying, based on determining that the size information of the cluster is consistent with the rack information, orientation information of the cluster, and generating a rack list containing the cluster, the size information of the cluster, and the orientation information of the cluster.

In some implementations, clustering the vertical poles can also include selecting a rack from the rack list, determining distances between each of the vertical poles in the selected rack, determining orientation information for each of the vertical poles in the selected rack, and determining a rack type of the selected rack based on the distances and the orientation information for each of the vertical poles.

As another example, determining pallet footprints based on the detected rack sections can also include for each of the detected rack sections, determining whether the detected rack section has a select rack type, calculating, based on determining that the detected rack section has the select rack type, two pallet footprint centers in the detected rack section, and calculating, based on determining that the detected rack section does not have the select rack type, one pallet footprint center in the detected rack section.

In some implementations, determining heights of each shelf section in the detected rack sections can include for each of the detected rack sections, filtering out vertical objects from the detected rack section, detecting horizontal planes in the filtered rack section, identifying whether the horizontal planes have characteristics of a shelf section, determining a high shelf score based on determining that the horizontal planes have characteristics of the shelf section, and determining a low shelf score relative to the high shelf score based on determining that the horizontal planes do not have characteristics of the shelf section, wherein the low shelf score is closer to 0 and the high shelf score is closer to 1.

The technology and methods described throughout this disclosure provide numerous advantages. For example, the disclosed technology can automate processes for generating blueprints and maps of a physical space. Automating such processes can reduce an amount of time and resources needed for mapping the physical space. Since cameras can be positioned throughout the physical space to capture images of the physical space, users, such as warehouse workers, may not be required to walk around the entire physical space and capture images of the physical space using traditional scanning technologies and techniques. Instead, the users' time can be allocated to performing other tasks in the warehouse or other physical space, thereby improving the users' efficiency.

As another example, maps of the physical spaces can be more accurate. Since users are not manually mapping the physical space, human error can be removed or otherwise mitigated using the described technology. The disclosed technology can therefore improve the accuracy of blueprints and maps of physical spaces. The disclosed technology can also allow for continuous updating and/or renewing of the blueprints and maps without human intervention.

As yet another example, the disclosed technology can be used to more accurately determine process flows, movement, and/or other features specific to the physical space while the physical space is occupied and/or used for its intended purpose(s). For example, in a warehouse environment, exact rack sections and shelves positions can be identified using the point cloud data. These identified positions can then be used to determine placement of pallets in the warehouse. Thus, the pallets can be efficiently collected, stored, and moved within the space. This can improve and optimize warehouse efficiency. Similarly, the disclosed technology can be used to improve forklift tracking in warehouse. The forklifts can be tracked in real-time. Moreover, the forklifts can dynamically interact with the point cloud-generated blueprints and maps to improve navigation, reduce bottlenecks and traffic, and improve overall warehouse efficiency.

The details of one or more embodiments are set forth in the accompanying drawings and the description below. Other features and advantages will be apparent from the description and drawings, and from the claims.

DETAILED DESCRIPTION

This document generally describes using point clouds to generate blueprints and/or maps of a physical space.

Figure 1A:
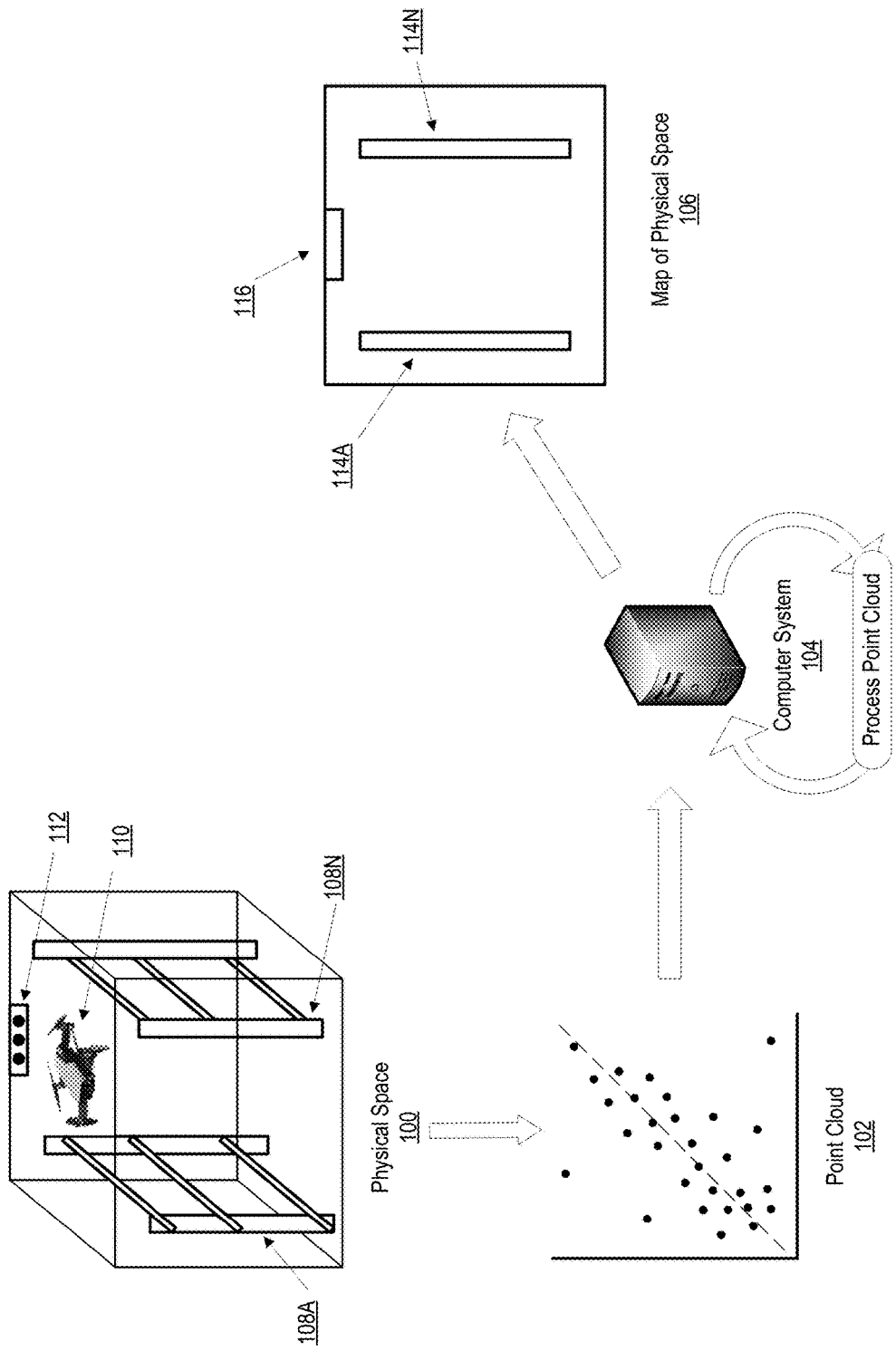
FIG. 1A depicts an exemplary mapping system using a point cloud.

FIG. 1A depicts an example mapping system, including a physical space 100, a point cloud 102, a computer system 104, and a map of the physical space 106. As depicted, the physical space 100 can include one or more racks 108A-N. In other implementations, the physical space 100 can include one or more other types of physical items other than racks 108A-N. For example, the physical space 100 can include walls, doorways, doors, tables, support beams, etc.

In some implementations, the physical space 100 can be a warehouse environment. In other implementations, the physical space 100 can be any type of storage facility (e.g., freezer). In yet other implementations, the physical space 100 can be a building, house, other structure, or an outdoor space/landscape. Still referring to FIG. 1A, the physical space 100 further includes a drone 110 and a stereoscopic camera 112. In some implementations, the physical space 100 can include multiple drones 110 and/or stereoscopic cameras 112. The drone 110 and the stereoscopic camera 112 can be configured to capture one or more 3D scans and/or images of the entire physical space 100. In some implementations, instead of at least one of the drone 110 and/or the stereoscopic camera 112, the physical space 100 can employ a person, forklift, and/or some type of device to capture 3D scans and/or images of the physical space 100.

Once the one or more 3D scans and/or images of the physical space 100 are captured, they can be used to generate one or more point clouds 102. The one or more point clouds 102 can be generated by the drone 110, a device in the physical space 100 that is used for capturing 3D scans/images, and/or any other computer system/computing device in communication with the drone 110, the stereoscopic camera 112, and/or the computer system 104. The one or more point clouds 102 can then be transmitted/communicated to the computer system 104. Communication described throughout this disclosure can occur via a network and/or a wireless/wired communication (e.g., BLUETOOTH, WIFI, Ethernet, etc.).

At the computer system 104, the point cloud 102 can be processed (e.g., filtered, cleaned) before being used to generate the map of the physical space 106. The map of the physical space 106 can be generated by the computer system 104 and/or another computer system/computing device in communication with the computer system 104. The map of the physical space 106 can be an accurate map and/or blueprint that is updated in real-time, periodically, and/or automatically. For example, as depicted, the map of the physical space 106 includes a replication of the racks 108A-N, which are mapped racks 114A-N. The map of the physical space 106 further includes a replication of the stereoscopic camera 112, which is a mapped camera 116. In other implementations, the map of the physical space 106 can include replications of any other physical items and/or permanent structures within the physical space 100.

Still referring to FIG. 1A, the process described can be performed in real-time and/or at different times. For example, 3D scans and/or images of the physical space 100 can be captured at a time 1. The point cloud 102 can be generated at a time 2. Processing the point cloud at the computer system 104 can be performed at a time 3. And finally, generating the map of the physical space 106 can be performed at a time 4. Moreover, the described process can be performed more than once and can be automatically/periodically performed in order to ensure updated maps and/or blueprints of the physical space 100 are maintained.

Figure 1B:
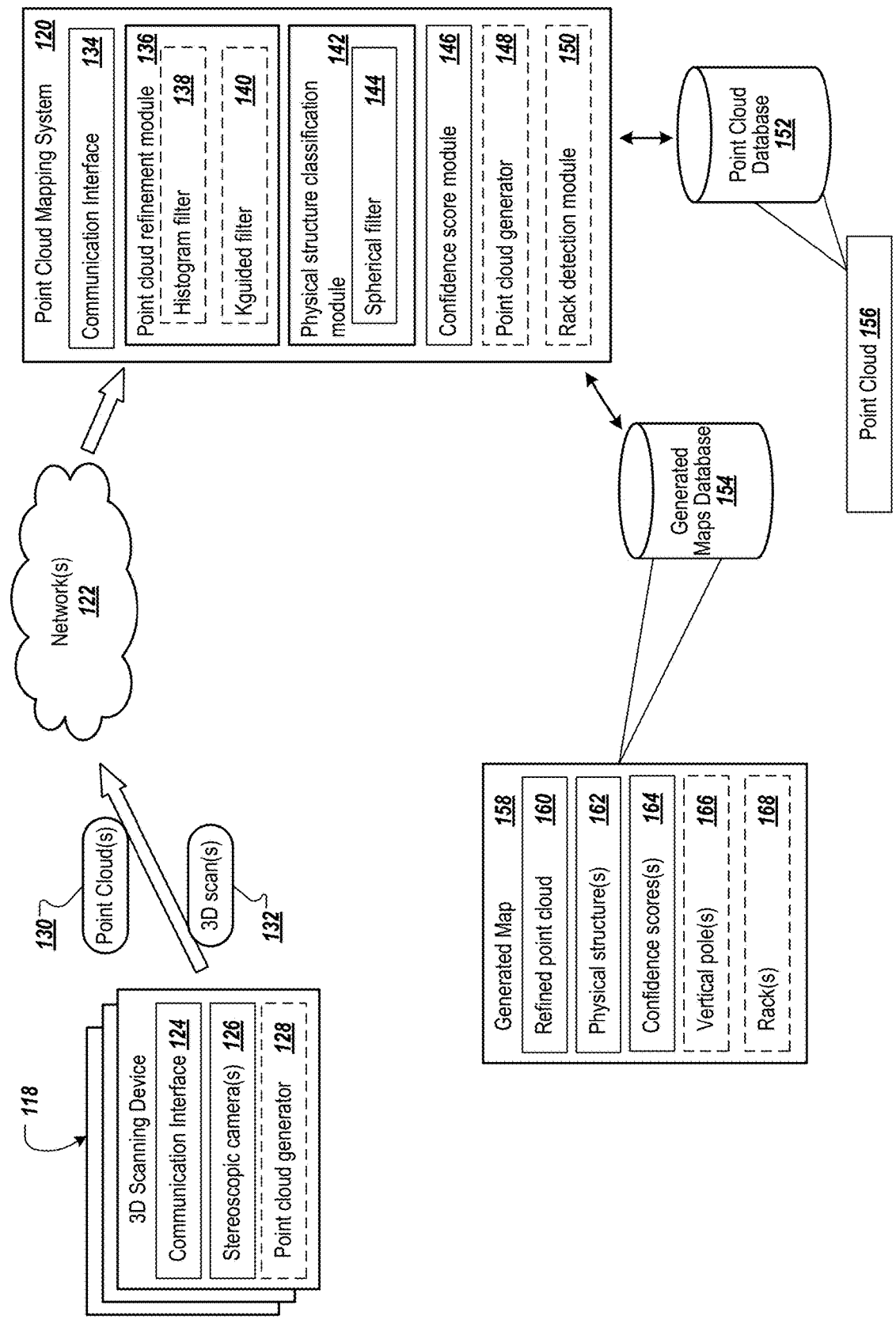
FIG. 1B depicts an exemplary system diagram of the disclosed invention.

FIG. 1B depicts an exemplary system diagram of the disclosed invention. As depicted, a 3D scanning device 118 and a point cloud mapping system 120 can be in communication via a network 122, as previously discussed in FIG. 1A. One or more 3D scanning devices can be in communication with the point cloud mapping system 120. The 3D scanning device 118 can be at least one of the drone 110 and the stereoscopic camera 112 previously discussed in reference to FIG. 1A. Moreover, the point cloud mapping system 120 can be the computer system 104 disclosed in FIG. 1A and throughout this disclosure.

The 3D scanning device 118 can include a communication interface 124, at least one stereoscopic camera 126, and an optional point cloud generator 128. The communication interface 124 can facilitate communication between the 3D scanning device 118 and the point cloud mapping system 120 over the network 122, as discussed. The at least one stereoscopic camera 126 can capture one or more 3D scans and/or other images of a physical space. In some implementations, the 3D scanning device 118 can have, instead of or in combination with the stereoscopic camera 126, other types of image capturing sensors, cameras, and/or devices configured to capture 3D scans and/or images of the physical space. As mentioned, the 3D scanning device 118 can optionally include the point cloud generator 128, configured to generate a point cloud from the captured 3D scans/images. If the 3D scanning device 118 includes the point cloud generator 128 and generates point clouds, those points clouds 130 can be transferred/communicated to the point cloud mapping system 120 via the network 122. The point cloud mapping system 120 can then store such point cloud(s) 130 in a point cloud database 152. The point cloud database 152 stores generated point clouds, as indicated by exemplary point cloud 156. If the 3D scanning device 118 does not generate point clouds, then 3D scan(s) 132 can be transferred/communicated from the device 118 to the point cloud mapping system 120 via the network 122.

The point cloud mapping system 120 can use the received 3D scan(s) to generate one or more point clouds via a point cloud generator 148. Thus, the system 120 can optionally include the point cloud generator 148. The point cloud mapping system 120 can include a communication interface 134, a point cloud refinement module 136, a physical structure classification module 142, and a confidence score module 146. The system 120 can further and optionally include a rack detection module 150. The system 120 can be in communication, via the communication interface 134 and over the network 122, with the 3D scanning device 118, as well as the point cloud database 152 and a generated maps database 154.

Once the system 120 generates a point cloud (via the point cloud generator 148) or receives the point cloud 130 from the 3D scanning device 118, the point cloud can be refined at the point cloud refinement module 136. The point cloud refinement module 136 can optionally include a histogram filter 138 and/or a k-guided filter 140, both of which can be used separately and/or in combination to clarify and clean up the point cloud. Clarifying and cleaning up the point cloud involves making physical structures more defined by up-sampling and/or down-sampling points in the point cloud. Clarifying and cleaning up the point cloud involves making physical structures more defined by up-sampling and/or down-sampling points in the point cloud. Once refined, the point cloud can go through the physical structure classification module 142 to identify and classify any physical structures/items/objects within the point cloud. The module 142 can include a spherical filter 144 for identifying and classifying physical structures. The confidence score module 146 can further be used to determine scores for identified physical structures and overall accuracy of the refined point cloud. Finally, the rack detection module 150 can be used to identify vertical poles and racks from the point cloud. The module 150 is beneficial for determining racks in a warehouse environment or other type of storage facility. Each of the modules and/or filters comprising the point cloud mapping system 120 are discussed in further detail below.

Once any determinations (e.g., a refined point cloud, final map, classification and scores of physical structures, etc.) are made, such determinations can be stored in the generated maps database 154. The database 154 can store a plurality of generated maps 158. The generated map 158 can include a refined point cloud 160, at least one identified and/or classified physical structure information 162, and at least one confidence score 164 associated with accuracy of the refined point cloud 160 and/or the at least one physical structure 162. The generated map 158 can further and optionally include at least one vertical pole information 166 and at least one rack information 168.

Figure 2:
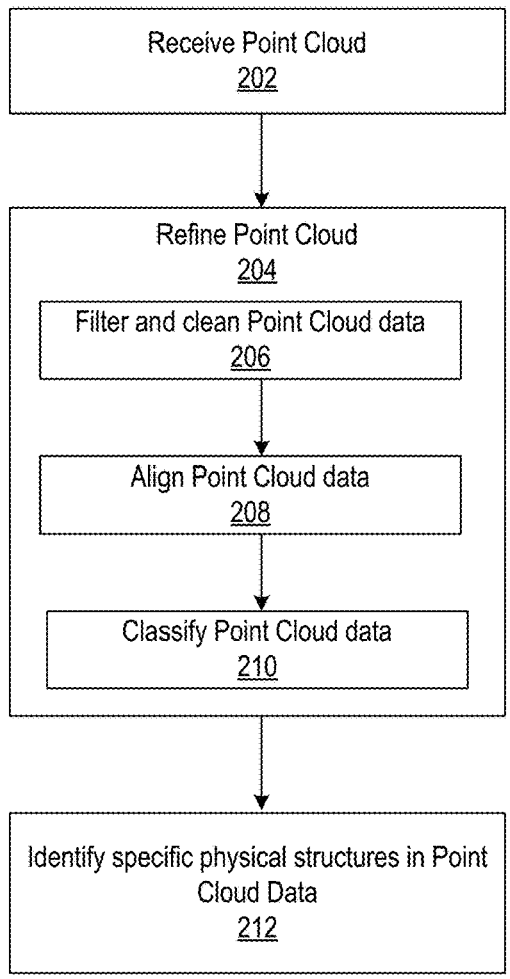
FIG. 2 is a flowchart of a process for processing the point cloud.

FIG. 2 is a flowchart of a process 200 for processing a point cloud. The process 200 can be performed by any computing device, such as the computer system 104 (refer to FIG. 1). In an exemplary warehouse environment, a point cloud can be used to map the warehouse environment. As a result, identifying objects in the warehouse, such as vertical poles used for racks, can be helpful to determine a layout of the warehouse. First, the computer system receives a point cloud in step 202. As previously mentioned, the computer system can receive the point cloud from a drone that takes 3D scans of a physical environment. In a warehouse, a new point cloud scan includes at least one of walls, floor, ceiling, racks, pallets, doors, light fixtures, vertical support poles, humans, forklifts, noise, random variations, occlusions, etc. In, for example, an outdoor space, a new point cloud scan can include at least one of trees, shrubs, buildings, homes, parking lots, people, highways, overpasses, bridges, lakes, rivers, etc. The new point cloud scan is aligned randomly in space and often a floor of the physical environment is nearly parallel to the XY-plane. Typically, the point cloud scan includes noise, which can include several points from physical objects in other nearby locations and/or rooms. As a result, this noise increases a bounding box of the physical environment beyond just the walls or other existing perimeter.

Next, the computer system refines the point cloud (step 204). The computer system filters and cleans the point cloud data in step 206 (e.g., by up-sampling and/or down-sampling points in the point cloud data), then aligns point cloud data in step 208, and finally classifies point cloud data in step 210. In step 206, the computer system uses several filters, such as guided filters, that can reduce a variation of point positions. Guided filters can make surfaces cleaner, make edges sharper, and remove outlier noise. Using this type of filter as a first step can improve accuracy of all point cloud processes discussed below. Exemplary filters used by the computer system include a histogram filter and a k-guided filter. Alternatively, if a guided filter is not used in the filtering and cleaning point cloud data step (206), then an outlier filter can be used to remove some noise in the point cloud scan. For each noise detection, a confidence score/value associated with identified physical objects is decreased accordingly.

In step 208, the point cloud data can be aligned to X, Y, and Z axes. In other words, the point cloud is rotated and oriented in a proper direction. For example, a warehouse room scan can be received (step 202) in an arbitrary space, not aligned with any of the axes. The scan can then be rotated and aligned to a proper space of the warehouse. In some examples, the point cloud can be lined up with a width of a wall in the warehouse in order to determine the point cloud's proper orientation. The computer system can look for reference points around doorways, doorframes, windows, and/or other objects that may appear in the point cloud to orient the point cloud appropriately. In yet other examples, the computer system can detect a bounding box of the physical space (e.g., the warehouse room) that hugs walls of the physical space and then rotate the physical space such that the bounding box is aligned with X, Y, and Z axes. A tight-fitting bounding box can also be used to more easily identify noise points outside of the walls of the physical space. Performing this alignment step is important because it decreases the amount of time it takes to make certain computations later in the point cloud processing.

Once the point cloud data undergoes alignment and initial cleaning, object detection and localization can begin (step 210). A spherical filter can be used in this step to classify the point cloud data (discussed in more detail below in FIGS. 6A-6C). In this step, physical objects, perimeters, and other items appearing in the point cloud can be identified, classified, and scored. In some implementations, some identified, classified, and scored items can be removed from the point cloud. For example, floors and ceilings can be eliminated. Points that are not likely to be vertical poles in the warehouse environment can also be eliminated.

Based on the purpose and use of the point cloud, different physical objects can be identified for elimination and/or keeping. For example, in land surveying, the computer system may be configured to identify and eliminate trees and shrubs. The computer system may further be configured to identify buildings and parking lots and keep those in the point cloud. Often, the easiest thing to detect in the point cloud scan is the floor or some other horizontal plane. For example, in the warehouse environment where rack detection may be most important, points that are likely to be part of the floor can be identified and removed from the point cloud. In most implementations, the ceiling is also relatively easy to detect, as are light fixtures, beams, evaporative coils, and other objects that may hang from the ceiling. Walls may be more challenging to detect, but using classifiers, vertical pole and other physical item confidence scores can be adjusted accordingly such that walls, ceilings, etc. are removed from the point cloud.

Once point cloud refinement is completed (204), the computer system can identify specific physical structures in the remaining point cloud data (step 212). For example, vertical poles, racks, and/or aisles in the warehouse can be identified and assigned confidence scores. In the land surveying example, the system can identify homes, buildings, parking lots, and/or roads. As a result, such identifications can be used to generate an accurate blueprint and/or map of the associated physical space.

Figure 3:
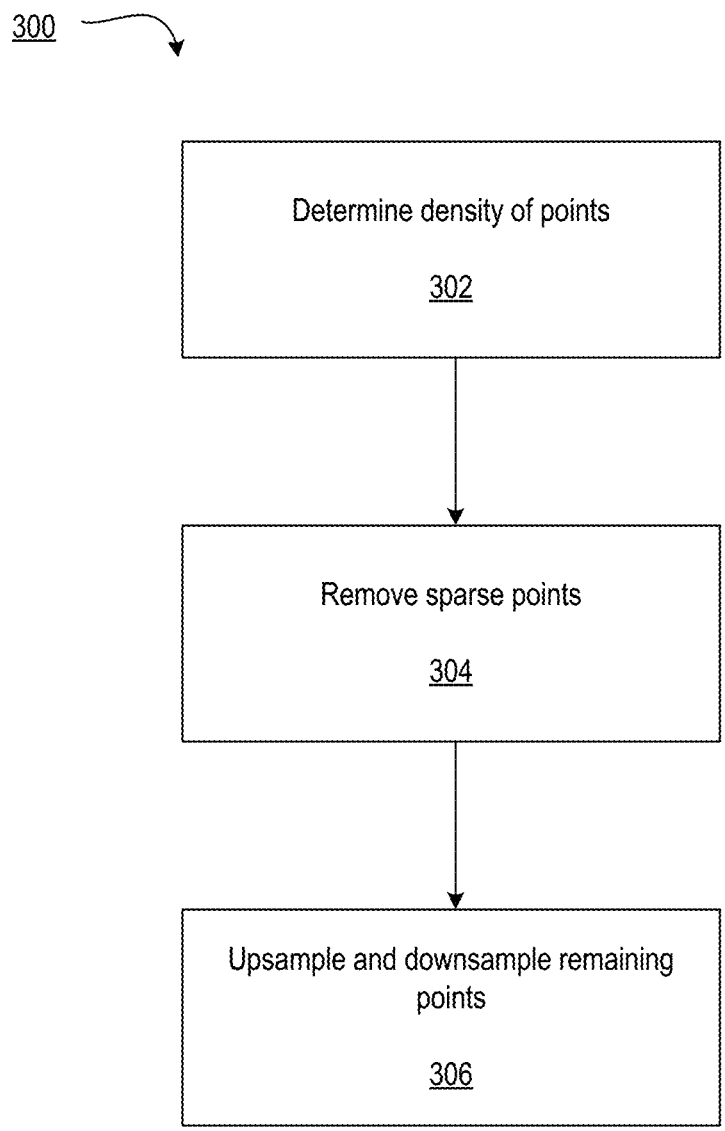
FIG. 3 is a flowchart of a process for filtering the point cloud.

FIG. 3 is a flowchart of a process 300 for filtering the point cloud. Process 300 can be performed by a computer system like system 104 (refer to FIG. 1) or any other computing device. First, the computer system can determine a density of points in the point cloud (step 302). The computer system can remove sparse points from the point cloud (step 304). Then, the computer system can up-sample and/or down-sample the remaining points in the point cloud in step 306. Up-sampling can require the computer system to add points where points are sparse in a location of the point cloud where a physical structure is located. Down-sampling can require the computer system to remove points where there is an overabundance of points in a location of the point cloud. In some implementations, the computer system can up-sample and down-sample the same point cloud in different locations. In other implementations, the computer system can just up-sample or down-sample. Process 300 is advantageous in order to reduce noise and draw out physical structures in the point cloud. Once the point cloud is cleaned and noise is removed, the point cloud data can more efficiently be used in point cloud machine learning and the techniques described throughout this disclosure.

Figure 4B:
FIGS. 4A-B depict exemplary results from filtering the point cloud.
Figure 4A:
Figure 4A:

FIGS. 4A-B depict exemplary results from filtering the point cloud (refer to FIG. 3). FIG. 4A depicts a 3D scan of an outdoor physical space before refinement. FIG. 4A's 3D scan is of a street with buildings, parking lots, houses etc. As shown, the scan is not refined or detailed enough for one to identify what each of the objects and/or shapes are in the scan. FIG. 4B depicts the same 3D scan after it is refined with the filtering techniques, such as removing sparse points, up-sampling, down-sampling, k-guided filtering and histogram filtering. As a result of such filtering/refinement, one can more easily identify each of the objects/shapes in the 3D scan.

Differing colors in the scan indicate a confidence score for each of the identified objects/shapes. For example, a purpose of the 3D scan in FIGS. 4A-B can be to identify buildings and houses for a land surveying project. When an object/shape in this scan is red, it is more likely to be one of the identified things (e.g., 90% accurate identification post-filtering). In the example of FIG. 4B, the red squares and rectangles represent buildings and homes. Objects, shapes, and/or space that appear in green are a little less likely to be one of the identified things (e.g., 80% accurate identification post-filtering). And, objects, shapes, and/or space that appears in blue are even less likely to be one of the identified things (e.g., 50% accurate). Thus, streets, parking lots, and other open spaces appear in blue in FIG. 4B since they are the least likely to be representative of buildings and homes.

Similar results as those shown in FIGS. 4A-B can be attained by using the 3D scanning and filtering techniques discussed throughout this disclosure in different settings. For example, 3D scans can be captured of rooms in a building, a warehouse, and/or any other physical environment to achieve comparable results.

Figure 5B:
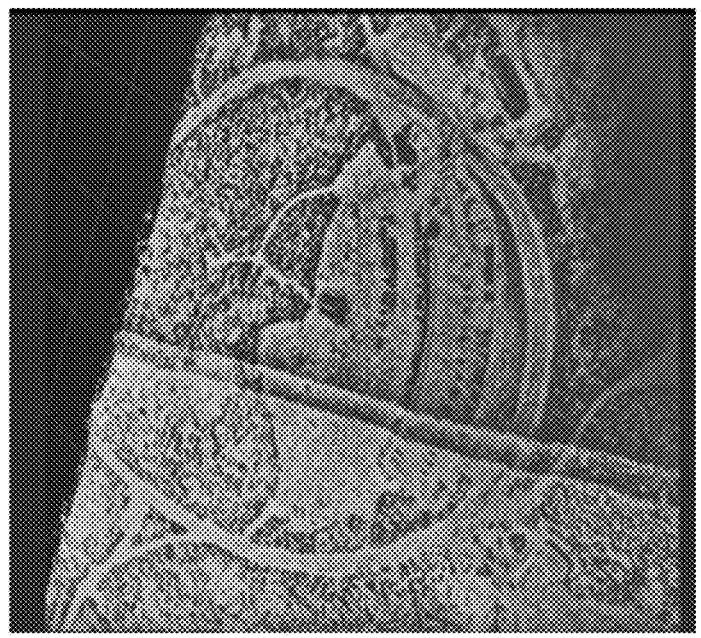
FIGS. 5A-B depict exemplary results from filtering the point cloud.
Figure 5A:
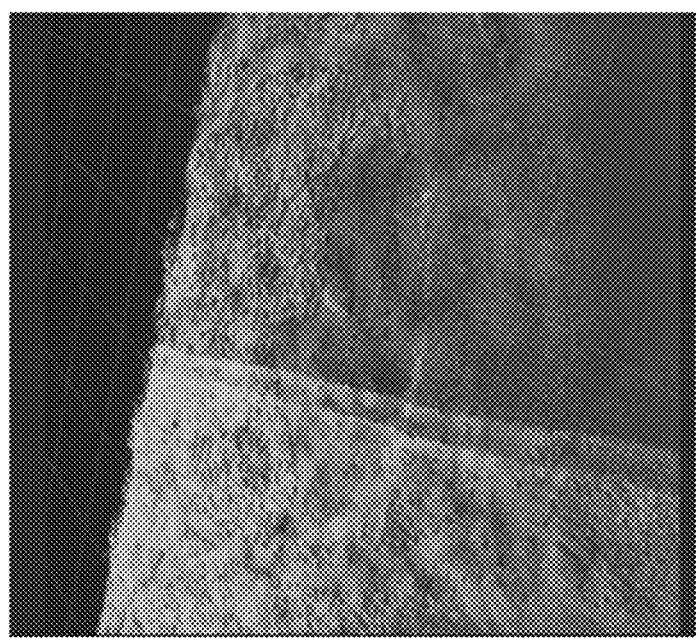

FIGS. 5A-B depict exemplary results from refining and/or filtering the point cloud (refer to FIG. 3). FIG. 5A depicts a 3D scan of an outdoor physical space before refinement. FIG. 4A's 3D scan is of a curved street with buildings, parking lots, trees, houses etc. As shown, the scan is not refined or detailed enough for one to identify what each of the objects and/or shapes are in the scan. In other words, the point cloud has sparse points, which results in less point density within the point cloud. Because there is less density, points can be added to areas of the point cloud in order to increase the density, thereby drawing out physical structures/objects from the original point cloud. Therefore, FIG. 5B depicts the same 3D scan after it is refined with the techniques described in FIG. 3. In FIG. 5B, points are added in order to increase point density. Up-sampling, down-sampling, k-guided filtering, and/or histogram filtering techniques can also be employed in order to further refine the point cloud, reduce noise, and draw out physical structures/objects.

As described in relation to FIGS. 4A-B, differing colors in the scan indicate a confidence score for each of the identified objects/shapes. For example, in FIGS. 5A-B, objects/shapes that are greener are more likely defined/identified objects, such as trees, streets, parking lots, and/or buildings. These objects are more accurately identified post-filtering, as depicted in FIG. 5B. Objects/shapes that are bluer are less likely to be defined/identified things. These objects would be less accurately identified post-filtering, as depicted in FIG. 5B. Similar results as those shown in FIGS. 4A-B and 5A-B can be attained by using the 3D scanning and filtering techniques discussed throughout this disclosure.

Figure 6A:
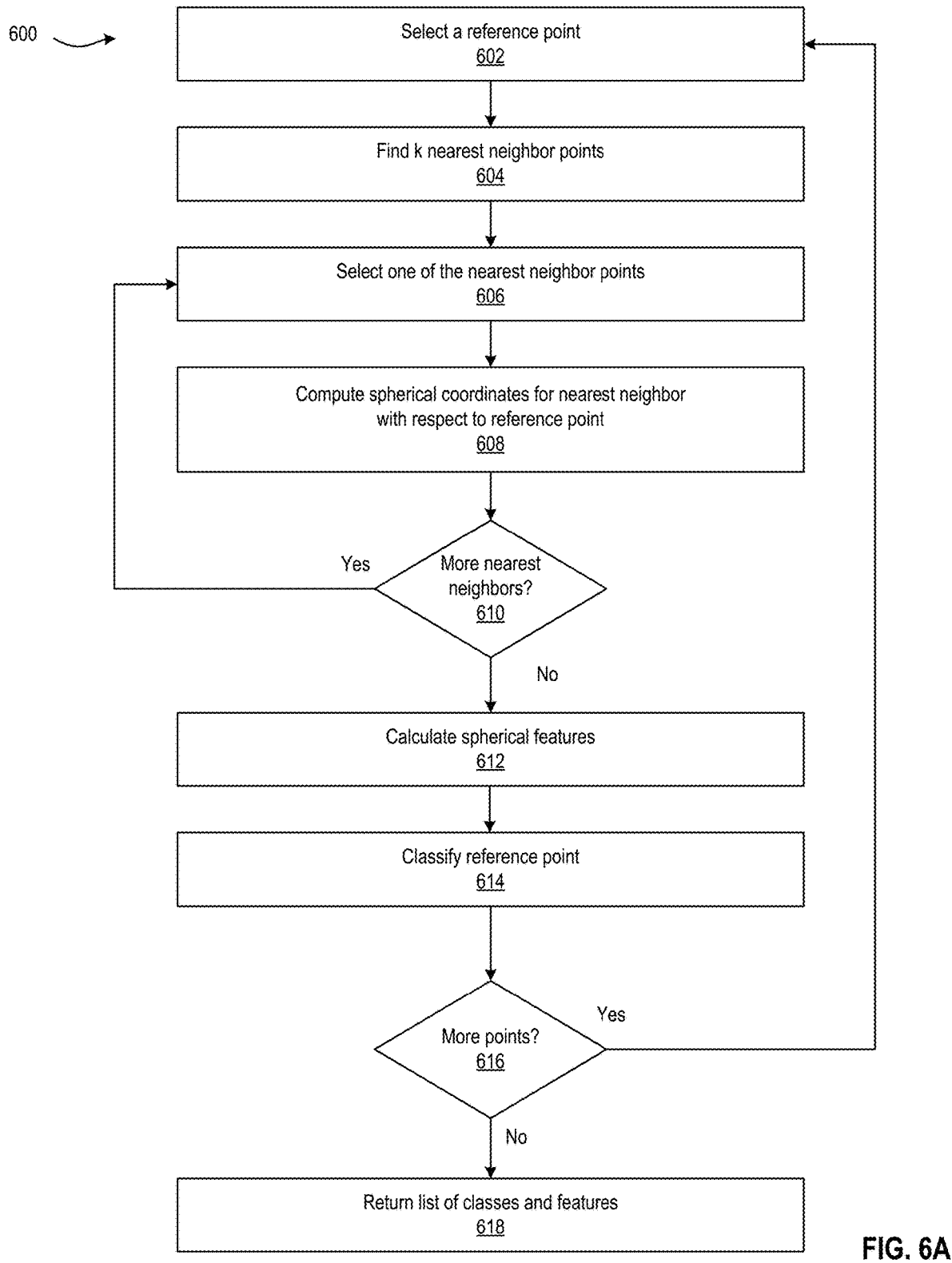
FIG. 6A is a flowchart of a process for a spherical features algorithm.
Figure 6C:
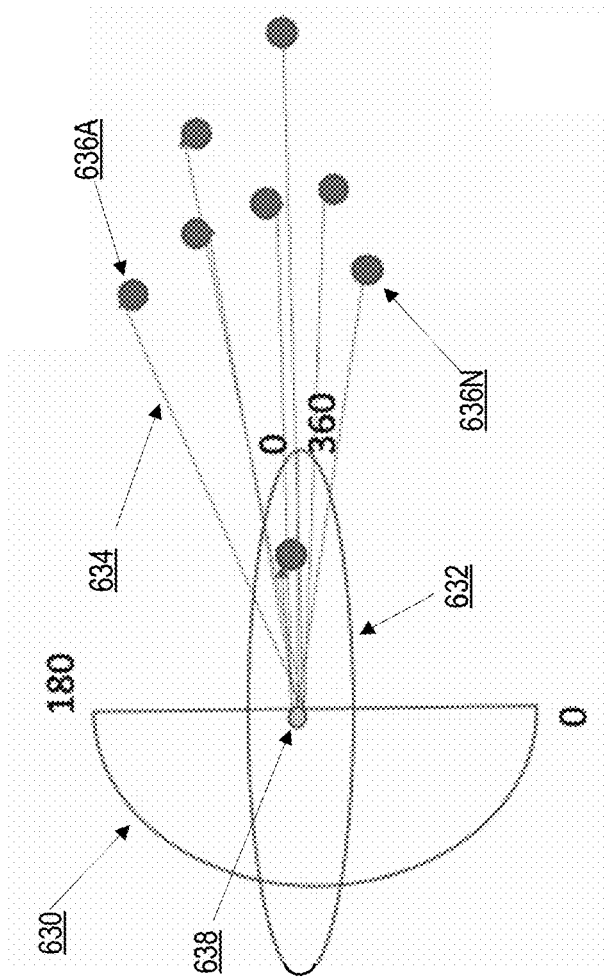
FIGS. 6B-C are graphical depictions of the spherical features algorithm during implementation.
Figure 6B:
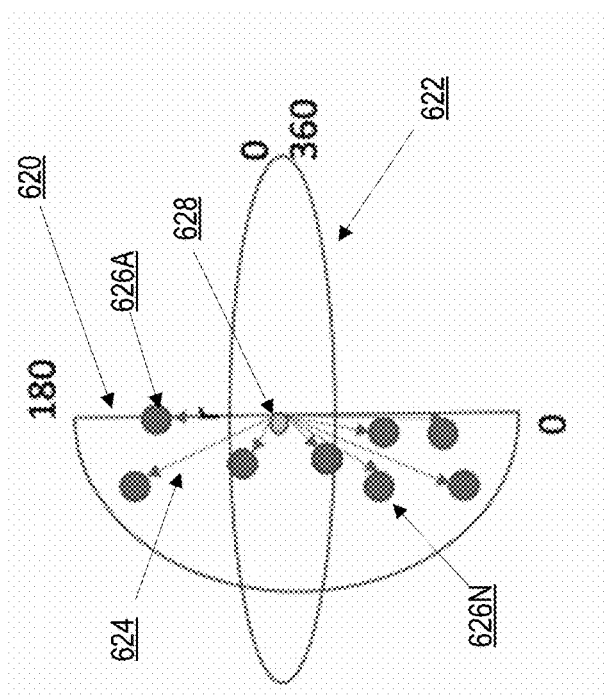

FIG. 6A is a flowchart of a process 600 for a spherical features algorithm. FIGS. 6B-6C are graphical depictions of the spherical features algorithm during implementation.

Process 600 can be performed by any computing device, such as the computer system 104 (refer to FIG. 1). The Process 600 is advantageous to classify objects in a physical space/point cloud. This Process 600 can be performed after refining and/or filtering. In other implementations, the Process 600 can be performed without refining and/or filtering and/or can be performed at the same time as refining and/or filtering.

The Process 600 starts with selecting an origin point (e.g., reference point, point of reference) from the point cloud at step 602. The selected point becomes a focal point of reference/orientation and the center, or origin, of a spherical coordinate system. As a result, all of its neighboring points are viewed in relation to (or from the perspective of) the selected point. The nearest neighbors of the origin point can be located through some known technique in 604.

A nearest neighbor to the point of reference can be selected in 606. Once a neighbor point is selected, the computer system can identify elevation, radius, and azimuthal coordinates for the selected nearest neighbor, using the point of reference as the origin (step 608). The radius can be a distance from the neighbor point to the point of reference. The elevation indicates an inclination of the neighbor point from the point of reference, measured from −90°-90°. The azimuthal is a horizontal angle, ranging from 0°-360°, measured from a direction of the point of reference to a point on a horizon that is intersected by the neighbor's line of altitude. These are the spherical coordinates of the neighboring point with respect to the point of reference. The spherical coordinates of all of the neighboring points can be calculated in order to calculate spherical features of the central origin point.

In step 610, the computer system can determine whether there are more neighboring points of the origin point. If there are more neighbors, the computer system can return to step 606 and repeat the steps previously discussed for the next neighbor. If there are no more neighbors for the current origin point, the spherical features can be calculated for the origin point in step 612.

In step 612, the computer system can calculate spherical features for the origin point. For example, the computer system can identify minimal values, maximum values, mean values, and standard deviations of the elevation, radius, and azimuthal coordinates using known techniques; these 12 numbers can make up the spherical features of the currently selected origin point (e.g., point of reference). These features contain information about the local neighborhood of points around the given point of reference and can be used to determine what type of object the point belongs to or is a part of. These features can be stored for each point in the point cloud and used in subsequent computations.

In step 614, the computer system can use the recently determined spherical features of the origin point to classify it as belonging to one type of object or another. For example, a point can belong to a floor, a wall, a vertical pole, a support beam, a pallet, noise, etc. The classification of the point of reference can be determined based on the values of the spherical coordinates as well as the X, Y, and Z coordinates of the point itself. Objects of different types can contain points with different distributions of values for these 15 point features. For example, floor points can have any X and Y values, but their Z values can fall within a small range and can be centered around a height of the floor, which is likely to be around 0. Floor points can also have a small standard deviation in elevation parameter, and the minimum, maximum, and mean values of the elevation parameter can all be near 0. The minimum azimuthal angle for floor points is likely around 0, while the maximum is likely around 360, and the mean around 180. The standard deviation in the azimuthal parameter is likely large due to points being spread all around the reference point in a horizontal direction.

Points that make up a vertical rack pole can have different characteristic values for the 15 features. The values of the X, Y, and Z coordinates of the points can be any number as can the minimum, maximum, and mean values of the azimuthal angle, but the standard deviation of the azimuthal angle can be small since the pole does not spread out horizontally. Moreover, the standard deviation in the elevation parameter can be large due to a large vertical spread in the pole points. The minimum, maximum, and mean values of the radius feature can contain information about how dense or sparse the point cloud is around the given point of reference. This can indicate whether the point is noise or whether the point belongs to an object. A low standard deviation in radius can indicate that the points are bunched in a spherical shape or a ring while a large radial standard deviation can indicate that the points are spread out across space from the central point of reference. Heuristic algorithms can be created to check the values of each of these parameters in order to classify each specific type of object that is desirable (e.g., floors, walls, doors, rack poles, etc.). Machine learning algorithms can also be employed to perform classification based on the feature values.

After classification of the point of reference in step 614, the computer system can determine whether there are more points in the point cloud in step 616. If there are, the computer system can return to step 602 and repeat the steps previously disclosed for the next point in the point cloud.

Finally, once the computer system determines there are no more points in the point cloud to analyze, the computer system can return a list of point classifications in step 618. The list can include, for example, final classifications of every point in the point cloud, where such classifications are modified/adjusted throughout the process 600 (e.g., when the computer system returns to step 602, selects a new point of reference, and repeats the steps previously discussed) as well as the spherical features themselves (e.g., minimum, maximum, mean, and standard deviations of the spherical coordinates of each point neighborhood). In some implementations, the list can include what types of items/objects and/or planes exist in the point cloud based on the point classifications instead of, or in combination with, a list of classifications of every point in the point cloud. Moreover, a user at a computing device in communication with the computer system can determine what information should be returned in the list.

FIGS. 6B-C are graphical depictions of the process 600 during implementation. In particular, FIG. 6B depicts a selected point of reference 628 and its nearest neighbors 626A-N as spherical coordinates. FIG. 6B further includes an azimuthal 622, elevation 620, and radius 624. As discussed above, the azimuthal, elevation, and radius values for each of the nearest neighbors 626A-N can be identified. A standard deviation of the radius value for the reference point 628 can be small because the points are generally close to each other. Thus, the reference point 628 likely is not an outlier point. Further, there is a high standard deviation of elevation amongst the nearest neighbors 626A-N, which indicates that the reference point 628 is likely part of a particular object/item, such as a vertical plane.

FIG. 6C depicts a selected point of reference 638 and its nearest neighbors 636A-N as spherical coordinates. FIG. 6C further includes an azimuthal 632, elevation 630, and radius

634. In this example, the standard deviation of radius for the nearest neighbors 636A-N is high. Thus, it is more likely that there are outlier points and/or the points do not comprise an item/object in the physical space in reference to the point of reference 638. As previously discussed in FIG. 6A, analysis of standard deviations for all the points in the point cloud where different points of references are selected can indicate whether or not the points 636A-N are in fact part of an item/object in the physical space. Regardless, the exemplary depiction in FIG. 6C demonstrates that the reference point 638 likely is an outlier. The standard deviation of elevation is also small, which indicates that the points are horizontally, rather than vertically, spread out. Therefore, the reference point 638 likely is associated with a horizontal plane rather than an item/object (e.g., vertical pole) in the physical space. Finally, the standard deviation of azimuthal is somewhat small, which indicates that the points likely comprise a corner in the physical space (e.g., a warehouse environment, a room, etc.).

Figure 7A:
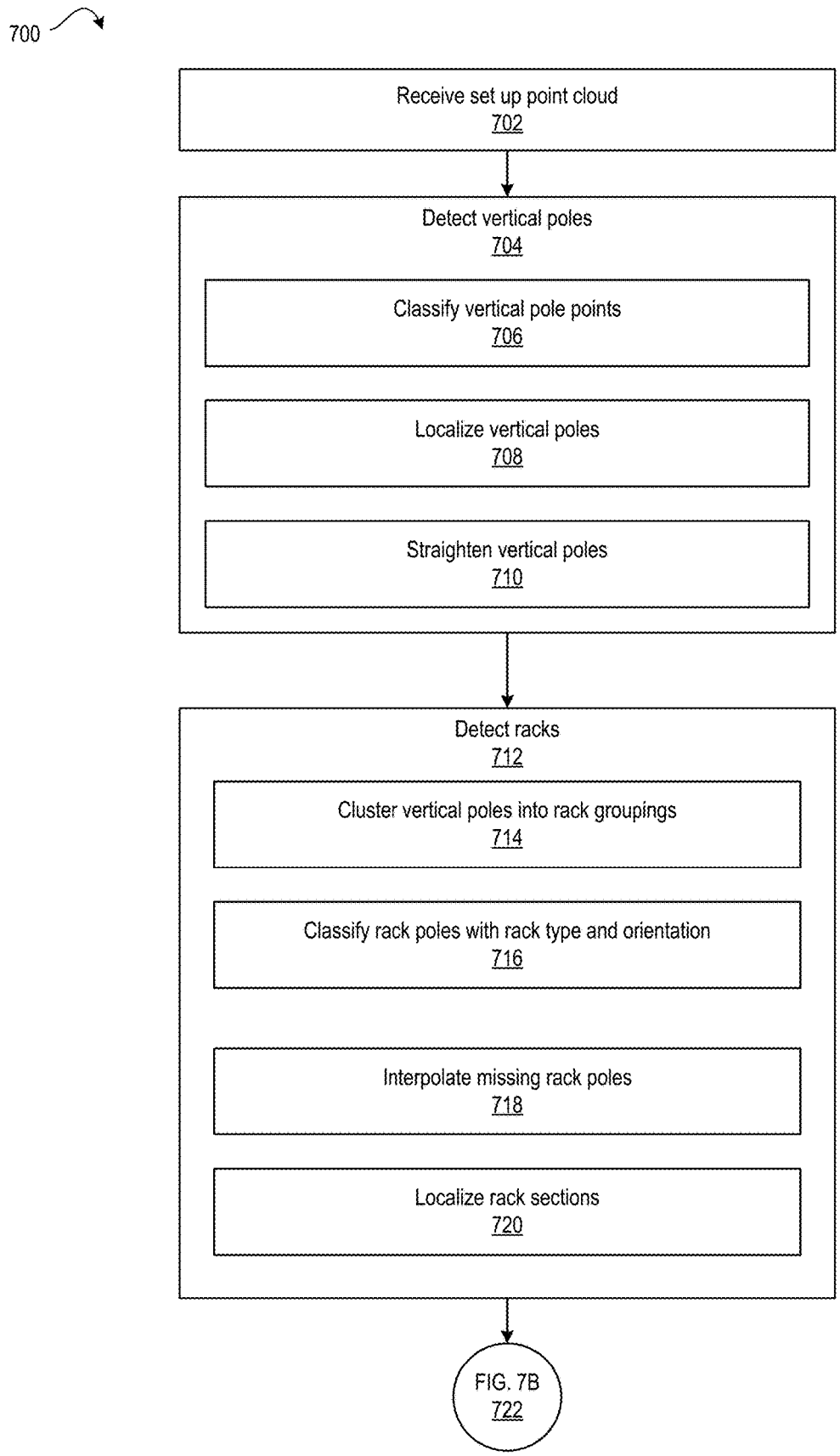
FIGS. 7A-B is an exemplary use of the disclosed system in a warehouse environment.
Figure 7B:
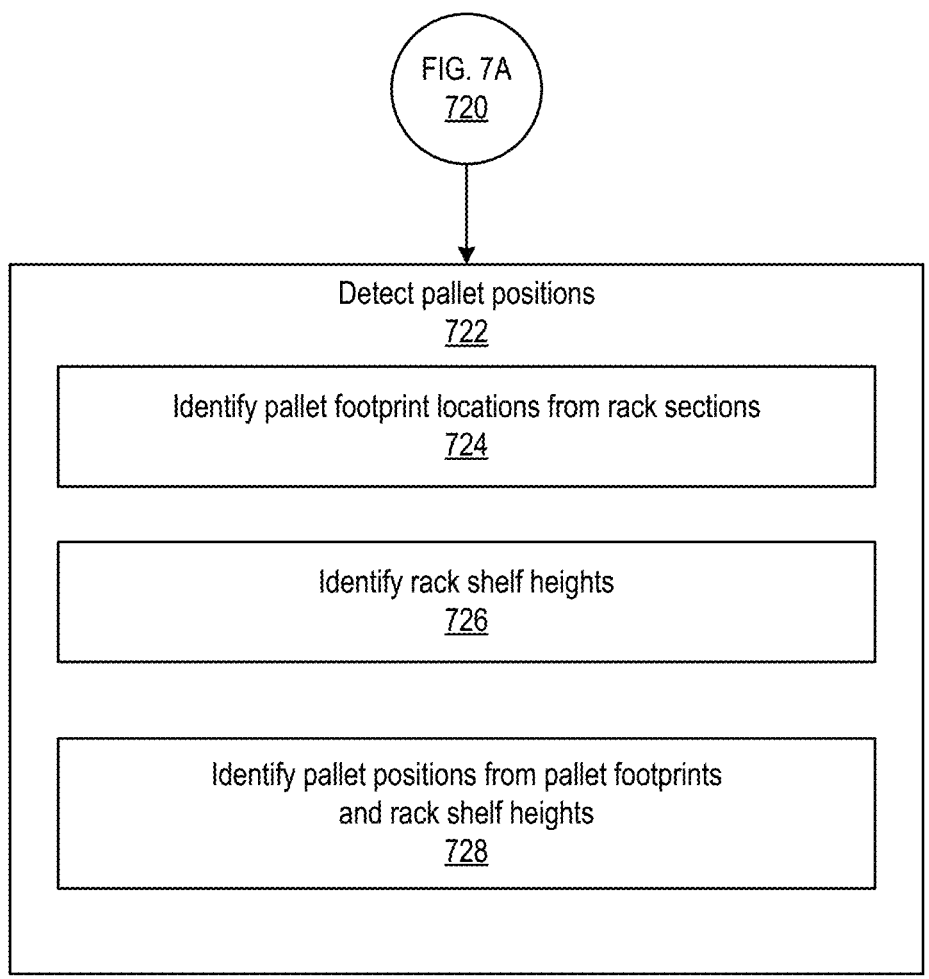

FIGS. 7A-B is an exemplary use of the system described in a warehouse environment. Process 700 can be performed by any computing device, such as the computer system 104 (refer to FIG. 1). Referring to the process 700 in both FIGS. 7A-B, the computer system receives a set up point cloud (step 702) (refer to FIGS. 2-6). The computer system can then detect vertical poles in step 704. Detecting the vertical poles includes multiple steps. For example, the computer system classifies and scores points associated with vertical poles (step 706), localizes the classified and scored vertical poles (step 708), and straightens the localized vertical poles (step 710). Once the computer system completes detection of vertical poles, the computer system can detect racks in step 712. Detecting the racks includes multiple steps. For example, the computer system clusters the vertical poles into groups of racks in step 714. Then, the computer system can classify the rack poles with a rack type and orientation in step 716. The computer system further interpolates missing rack poles (step 718) and finally detects or otherwise localizes rack sections from the classified rack poles in step 720. Once the computer system completes the steps to detect racks, the computer system can identify pallet locations for each of the detected rack sections (step 722). Detecting pallet locations also can include multiple steps. For example, the computer system can first identify pallet footprints (X and Y locations within the rack where pallets can be placed) in step 724. Next, the computer system can examine the entire rack point cloud to detect heights of the shelf levels in the rack (step 726). Once the shelf levels and pallet footprint locations are known, the computer system can examine the rack specifically at each pallet footprint location to find the specific shelf heights available at that XY location (step 728). Step 728 can result in a complete set of X, Y, and Z coordinates of the pallet locations for the rack.

The process 700 is beneficial because it can allow for accurate and real-time generation of maps/blueprints of the warehouse based on existing vertical poles, racks, and/or other physical structures in the warehouse environment. The maps generated from these point clouds can be used to track forklifts and/or other devices/human users as they operate/navigate through the warehouse environment in real-time.

Figure 8:
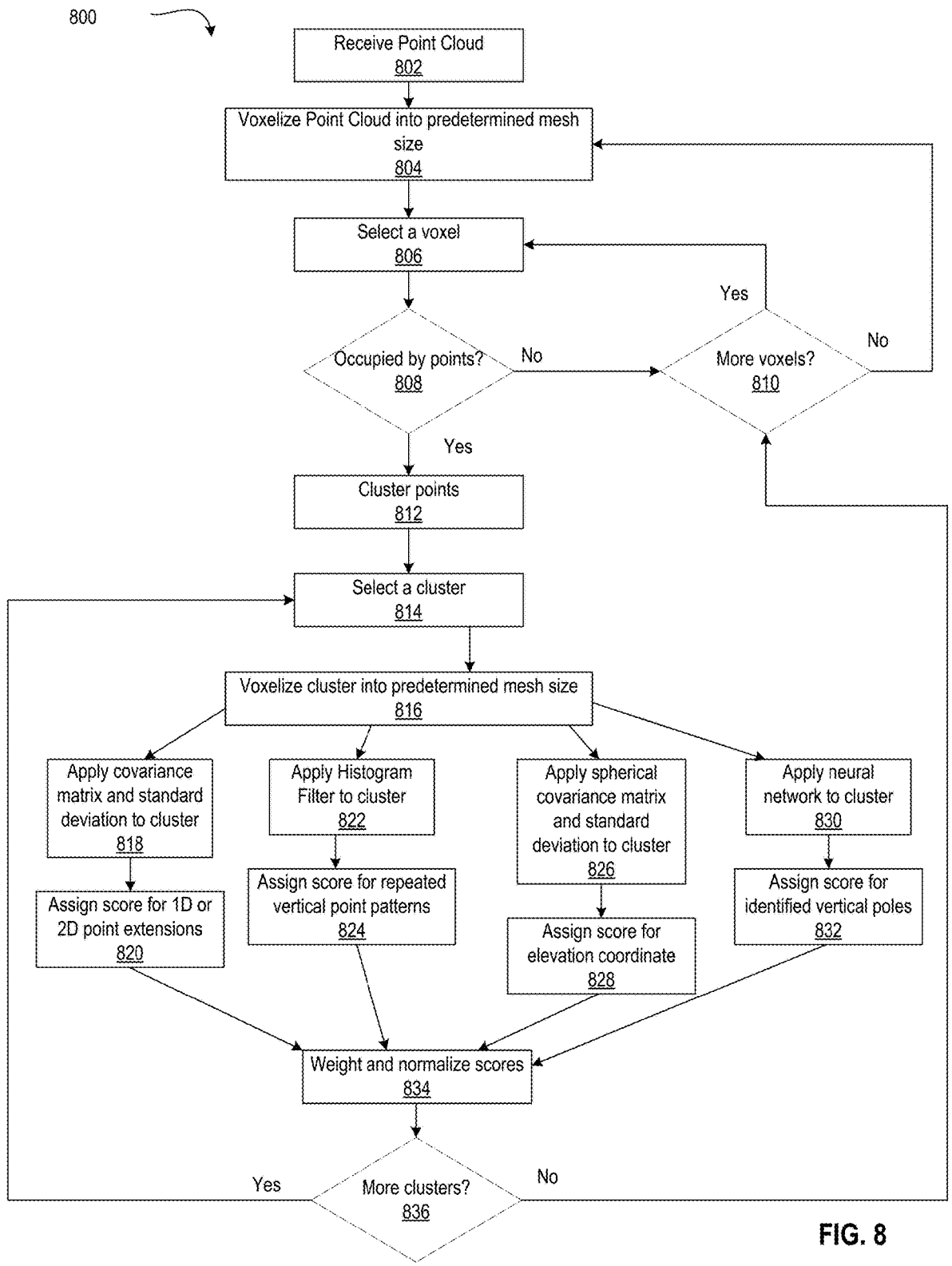
FIG. 8 is a flowchart of a process for classifying vertical pole points.

FIG. 8 is a flowchart of a process 800 for classifying vertical pole points. Process 800 can be performed by any computing device, such as the computer system 104 (refer to FIG. 1). The process 800 depicted in FIG. 8 refers to classifying and scoring vertical pole points (step 706) in FIG. 7A. Several features in a 3D scan/point cloud can indicate a presence of a vertical rack pole or any type of vertical pole that can appear in a warehouse environment or other building/structure. For example, if the shape that appears in the point cloud is tall and/or skinny, it likely is indicative of a vertical pole. Classifying points as vertical poles can be achieved by calculating features of the point cloud, such as curvature, covariance, etc. Using these values, a computer system can score the points, thereby classifying the points as being part of a vertical pole.

First, the computer system receives the set up point cloud in step 802, as previously discussed in reference to FIGS. 7A-B. Then, the computer system can voxelize the point cloud into predetermined mesh sizes (step 804). Voxelizing is when the computer system breaks down the point cloud into smaller chunks and then analyzes each of the chunks. For example, a predetermined mesh size can be 1 m×1 m×1 m. Thus, in step 804, the computer system can break apart the point cloud into 1 m×1 m×1 m chunks (e.g., sections). Next, in step 806, the computer system can select a voxel (e.g., one 1 m×1 m×1 m section). The computer system can determine whether the voxel is occupied by points (step 808). If there are not enough points in the voxel, the computer system can determine whether there are more voxels in the point cloud (step 810). If there are, the computer system can select a different voxel in step 806 and repeat the following steps. If there are no more voxels, the computer system returns to step 804 and voxelizes the point cloud using different predetermined mesh size(s) in step 804 and repeats the following steps. Using different mesh sizes can produce different results that can be averaged and used to more accurately identify vertical poles, especially in situations where a vertical pole is broken up or not continuous in the received point cloud. Thus, in one implementation, the computer system can determine that the point cloud should be voxelized twice into 1 m×1 m×1 m sections and 1 m×1 m×2 m sections. In some implementations, the computer system may not repeat the steps described throughout FIG. 8 and may instead voxelize the point cloud once.

Returning to step 808, if points occupy the selected voxel, the computer system can cluster the points in step 812. The computer system can use a known clustering algorithm, such as an HDBSCAN. The spherical features calculated in technique 700 can be used here as input to the clustering algorithm in order to obtain an optimal clustering result. Then, the computer system can determine that if there is a ball/grouping of points next to a plane, those points can be clustered into two clusters, wherein one cluster is representative of the plane and the other is representative of whatever object is next to the plane. The plane, for example, can be a floor. Moreover, when clustering the points in step 812, the computer system and/or a user at a device in communication with the computer system can determine how many clusters should be made within the selected voxel. For example, having multiple clusters may result in a more accurate classification and identification of all objects within the selected voxel. On the other hand, having multiple clusters in a small voxel size can result in a separation of points that otherwise would be indicative of a singular object. If the computer system determines that a 1 m×1 m×1 m voxel's points should be clustered into 10 clusters, it is possible the computer system may cluster points indicative of a vertical pole into more than one cluster because the points are separated by some amount of distance. As a result, it may be harder for the computer system to classify a cluster of points as a vertical pole when another portion of the vertical pole is in a separate cluster.

Once points are clustered in step 812, the computer system selects one of the clusters in step 814. The cluster is further voxelized into one or more predetermined mesh sizes (step 816). Doing so can result in more accurate classification of vertical poles as well as scoring on whether points are associated with vertical poles. Once the cluster is voxelized, the computer system can perform at least one of four methods to classify, identify, and score vertical pole points within the cluster. Those fourth methods include a covariance matrix (refer to steps 818-820), a histogram filter (steps 822-824), a spherical covariance matrix (steps 826-828), and/or a neural network (steps 830-832). The computer system can optionally perform these methods in any order. In other implementations, the computer system can perform only one of these four methods. In yet other implementations, the computer system can selectively perform a combination of any of these four methods.

First referring to the covariance matrix method, the computer system can apply a covariance matrix to the cluster and find standard deviation values in step 818. In this step, the computer system can weed out horizontal planes, such as floors, ceilings, and walls. The covariance matrix is beneficial to compare points and see how they correlate with each other over all of the X, Y, and Z axes. As a result, the computer system can differentiate between a plane and a vertical pole. For example, if points extend in one dimension, it is suggestive of a vertical pole—a vertical pole would extend, for example, in the Z direction. On the other hand, if points extend in two dimensions, it is more suggestive of a plane, such as a floor, ceiling, or wall. Once the standard deviations are completed, the computer system can identify a high standard deviation in the Z direction and a low standard of deviation in the X and Y directions. This will be indicative of points representing a vertical pole. Accordingly, the computer system can assign a score for one dimensional or two dimensional points extension in step 820. The scoring can be determined by the computer system and/or a user on a device in communication with the computer system. For example, the computer system can determine that scoring should be on a scale of 0 to 1, wherein 1 is indicative of a high probability the points represent a vertical pole and 0 is indicative of a low probability the points represent a vertical pole. Consequently, in the example of FIG. 8, in step 820, the computer system can assign a score of 0 for points that extend in the X and/or Y direction, or are indicative of a plane, and assign a score of 1 for points that extend only in the Z direction, or are indicative of a vertical pole.

Similarly, the computer system can apply a spherical covariance matrix to the cluster and determine a standard deviation (step 826). Applying the spherical covariance matrix is similar to the method described above regarding the covariance matrix. A difference is that instead of looking for standard deviation of Cartesian coordinates, in step 826, the computer system identifies standard deviations for spherical coordinates, namely, the elevation coordinate. Then, the computer system can assign a score for the elevation coordinate (step 828). Applying both the covariance matrix and the spherical covariance matrix can be redundant, however both produce slightly different scores. Thus, the computer system can identify and classify the points from more than one viewpoint, which is beneficial to weed out/remove points not indicative of vertical poles. Refer above to the disclosure concerning FIG. 6 for further discussion of a spherical covariance matrix.

The computer system can also apply a histogram filter to the cluster (step 822). Refer to the above disclosure for further discussion of the histogram filter. Using the histogram filter is beneficial to identify repeated points within each cluster. Once vertical point patterns are identified, the computer system can determine those point patterns are indicative of vertical objects. For example, if points are stacked on top of each other along the Z axis, then it is more indicative of a vertical pole. On the other hand, if points are spread out in more than one dimension/along more than one axis, then the points are more indicative of a plane. Where the points are spread out in more than one dimension, a low score, such as 0, can be assigned to that cluster (step 824). Where the points are stacked on top of each other and/or appearing in repeated vertical point patterns, a higher score, such as 1, can be assigned to that cluster in step 824.

Finally, as mentioned, the computer system can apply a neural network to the cluster in step 830. A basic neural network that is known in the field can be applied to the entire point cloud and/or a selected cluster. The neural network can receive all the clusters and determine whether, based on all the clusters together, there are vertical poles. Furthermore, a classification score can be generated for the point cloud, for every point in the point cloud, and/or for every cluster (step 832). The higher the score, the more indicative of a vertical pole.

Once the computer system applies one or more of the above described methods, the computer system can weigh and average the scores (step 834). In other words, the computer system can normalize each of the scores to find a final score for the cluster. The computer system may not combine the scores. In implementations where scoring in each of the methods outputs a different scaled score, the computer system can transform or normalize each of the scores onto a 0 to 1 scoring scale or any other appropriate scoring scale. Using the 0 to 1 scoring scale, a score of 1 can be associated with 100% certainty that the points are part of a vertical pole. A score of 0 can be associated with 100% certainty that the points are not part of a vertical pole. Furthermore, a score of 0.5 can be associated with no certainty about the points.

In other implementations of step 834, the computer system can determine which of the scores it will keep. For example, the computer system can apply all four methods, thereby generating four scores. However, the computer system can determine that it will only keep scores above a predetermined threshold value (assuming, for example, that all the scores are on the same scoring scale and/or have already been normalized). In another example, the computer system can determine that it will keep the score with the highest certainty that the points are associated with vertical pole(s), thereby ignoring the other scores. For example, if the covariance matrix (step 818), histogram filter (step 822), and spherical covariance matrix (step 826) all return scores of 0.3 but the neural network (step 830) returns a score of 0.8, the computer system can determine the 0.8 score should be kept because it indicates the highest certainty of vertical poles. 0.8 represents a higher certainty than 0.3 because it is farther from 0.5, which represents no certainty. Therefore, in step 834, the computer system does not combine scores from all the above mentioned methods—rather, the computer system identifies a most certain score and keeps that score.

Once the scores are weighted and normalized, the computer system can determine whether there are more clusters in step 836. If there are, the computer system returns to step 814, selects a cluster, and repeats the steps previously described. If and/or once there are no more clusters, the computer system returns to step 810, determines whether there are more voxels, and repeats the steps previously described. Repeating voxelization is optional. In other implementations, if the computer system determines at step 836 that there are no more clusters, the computer system can stop the process 800 described for FIG. 8.

Figure 9:
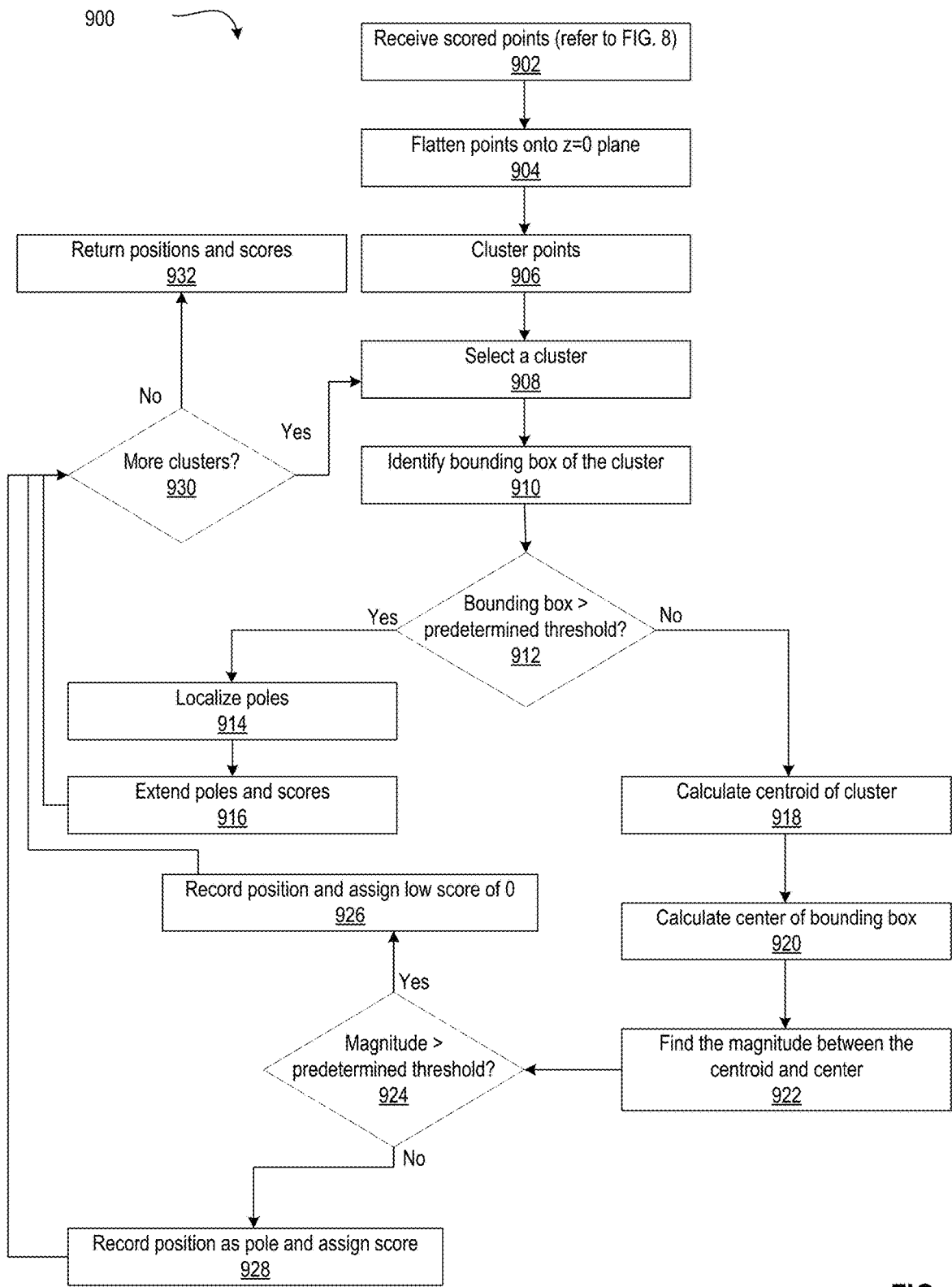
FIG. 9 is a flowchart of a process for localizing vertical poles.

FIG. 9 is a flowchart of a process 900 for localizing vertical poles. Process 900 can be performed by any computing device, such as the computer system 104 (refer to FIG. 1). The process 900 depicted in FIG. 9 refers to localizing the classified and scored vertical poles (step 708) in FIG. 7A. Once poles are scored, the computer system can determine which points are most likely to contain information about vertical pole locations. At this point, the computer system can be working with thousands or millions of scored points. The localization process results in creation of a condensed point cloud with fewer points than an input number of point cloud points. Thus, points in the output point cloud resulting from the process 900 can represent a single vertical pole. Consequently, localization can result in a list of pole predictions that consist of at least xy position(s) and optionally confidence score(s) associated with likelihood that the point(s) are vertical poles.

The computer system can receive scored points in step 902. The points are flattened onto a plane where z=0 (step 904). Once flattened, the points can be clustered in step 906. Clustering can be performed by known clustering algorithms. Clustering is important to determine which points belong to a same vertical pole. A cluster can be selected in step 908 and a center of the selected cluster can be found, thereby representative of a center of a vertical pole. Once the cluster is selected, the computer system can identify a bounding box in step 910. Then, the computer system can determine whether the bounding box is greater than a predetermined threshold (step 912). If the bounding box is greater than the threshold, the bounding box extends too much in either direction and the cluster is not likely to be a vertical pole. Consequently, the computer system can localize the poles within the bounding box in step 914 and then extend the poles and scores in step 916. Once step 916 is completed, the computer system can determine whether there are more clusters in step 930. If there are, another cluster can be selected in step 908 and the previously described steps can be repeated. If there are no more clusters, the computer system can return a list of pole positions and their associated confidence scores in step 932.

If the bounding box is less than the threshold, the bounding box does not extend too much in either direction and therefore the cluster is more likely indicative of a vertical pole. Consequently, the computer system can calculate a centroid of the cluster in step 918 and a center of the bounding box in step 920. Using those values, the computer system can find a magnitude, or difference, between the centroid of the cluster and the center of the bounding box in step 922. If the distance between the centroid and the center is minimal, it is more indicative that the cluster represents a vertical pole. However, if the distance between the centroid and the center is greater than a predetermined threshold value, step 924, the cluster most likely does not represent a vertical pole. Consequently, the cluster can receive a score of 0. Therefore, if the magnitude is greater than the threshold in step 924, the computer system can record a position and assign a low score of 0 in step 926. The computer system can then determine whether there are more clusters in step 930, as previously described.

Where the difference (e.g., magnitude) is less than the threshold in step 924, the position of the pole can be recorded and a score can be assigned in step 928. In some implementations, a score greater than 0 can be assigned, thereby indicative of a higher confidence/likelihood that the cluster is a vertical pole. The computer system and/or a user at a device in communication with the computer can determine a range of scores to use and/or the predetermined thresholds. For example, the computer system can determine that on a scale of 0 to 1, 0 indicates no confidence that the cluster represents a vertical pole. On the other hand, a score of 0.5 indicates 50% confidence that the cluster represents a vertical pole and a score of 1 indicates 100% confidence that the cluster represents a vertical pole.

Once step 928 is completed, the computer system can determine whether there are more clusters in step 930. If there are, the computer system can return to step 908, select another cluster, and repeat the steps previously described. If the computer system determines there are no more clusters to analyze, the computer system can return a list of positions of poles and their associated confidence scores (step 932). This list can be communicated to a user computer device and/or any type of display screen/computing device in communication (e.g., wired and/or wireless) with the computer system performing the technique 900.

Figure 10:
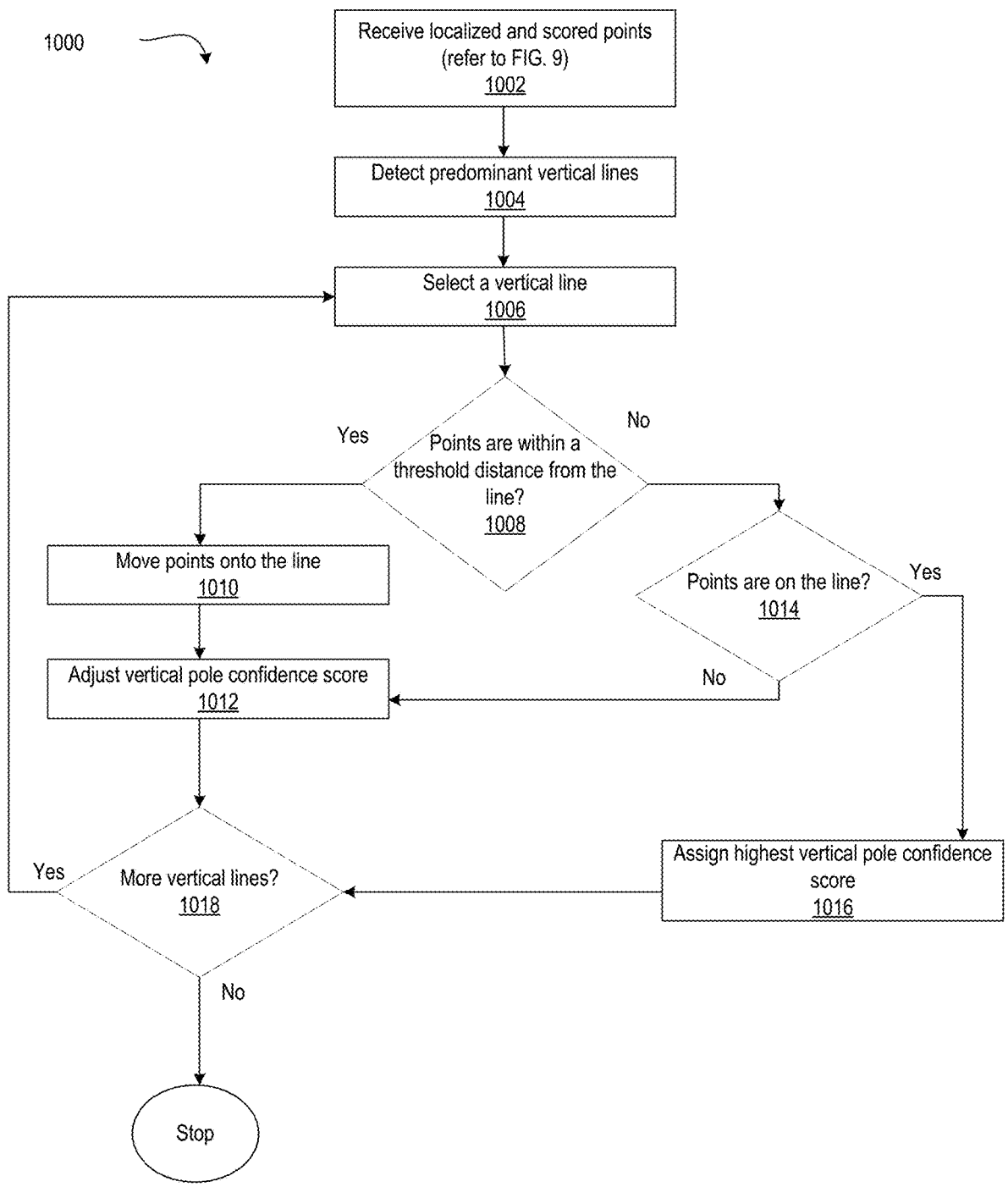
FIG. 10 is a flowchart of a process for cleaning vertical pole localization results.

FIG. 10 is a flowchart of a process 1000 for cleaning the localization results. Process 1000 can be performed by any computing device, such as the computer system 104 (refer to FIG. 1). The process 1000 depicted in FIG. 10 refers to straightening localized vertical poles (step 710) in FIG. 7A. Since one knows that vertical poles are meant to be straight and at ninety degree angles to one another, the computer system can use this information to clean up vertical pole predictions, add portions of poles that are missing, realign poles in rows, etc. Thus, the computer system can identify predominant lines and determine whether points near such lines should be on those lines or not. If the points should be on those lines, they are indicative of vertical poles and thus should be moved onto those lines. Cleaning the vertical pole localization results consists of adjusting xy pole predictions and their associated confidence scores.

As depicted in FIG. 10, the computer system receives localized and scored points in step 1002. Then, the computer system can detect predominant vertical lines (step 1004) by identifying vertical lines amidst the points. Areas that are more densely populated by points appearing in a vertical line can be identified as predominant vertical lines. Next, the computer system can select a predominant vertical line in step 1006. The computer system can determine whether there are points near that line in step 1008. In other words, the computer system can determine whether the points are within a threshold distance from the line. In some implementations, the computer system can make this determination based on identifying nearest neighbors and whether those neighbors are a certain predetermined distance from the predominant vertical line. If the points are near enough to the line such that they are within a certain predetermined distance (e.g., threshold value), the computer system can move those points onto the line (step 1010), thereby cleaning up and making straighter vertical lines representative of vertical poles. Once the points are moved onto the line, the computer system can adjust a vertical pole confidence score in step 1012. If the computer system moves the points onto the vertical lines, thereby adjusting their xy positions, then the confidence score increases because it is more indicative of an accurate vertical pole. The farther away a point is from the line, the lower its final score will be. A point that already lies directly on top of the line can have a score of 1. As previously mentioned, the computer system can assign scores on a scale of 0 to 1, such that if the computer system moves the points onto the line in step 1010, a score near 1 can be assigned to the vertical pole in step 1012 because it indicates the highest confidence that the vertical pole exists. Once the computer system adjusts the confidence score in step 1012, the computer system can determine whether there are more predominant vertical poles in step 1018. If there are, the computer system can return to step 1006, select a vertical line, and repeat steps 1008-1018 until there are no more predominant vertical lines to examine.

Figure 11:
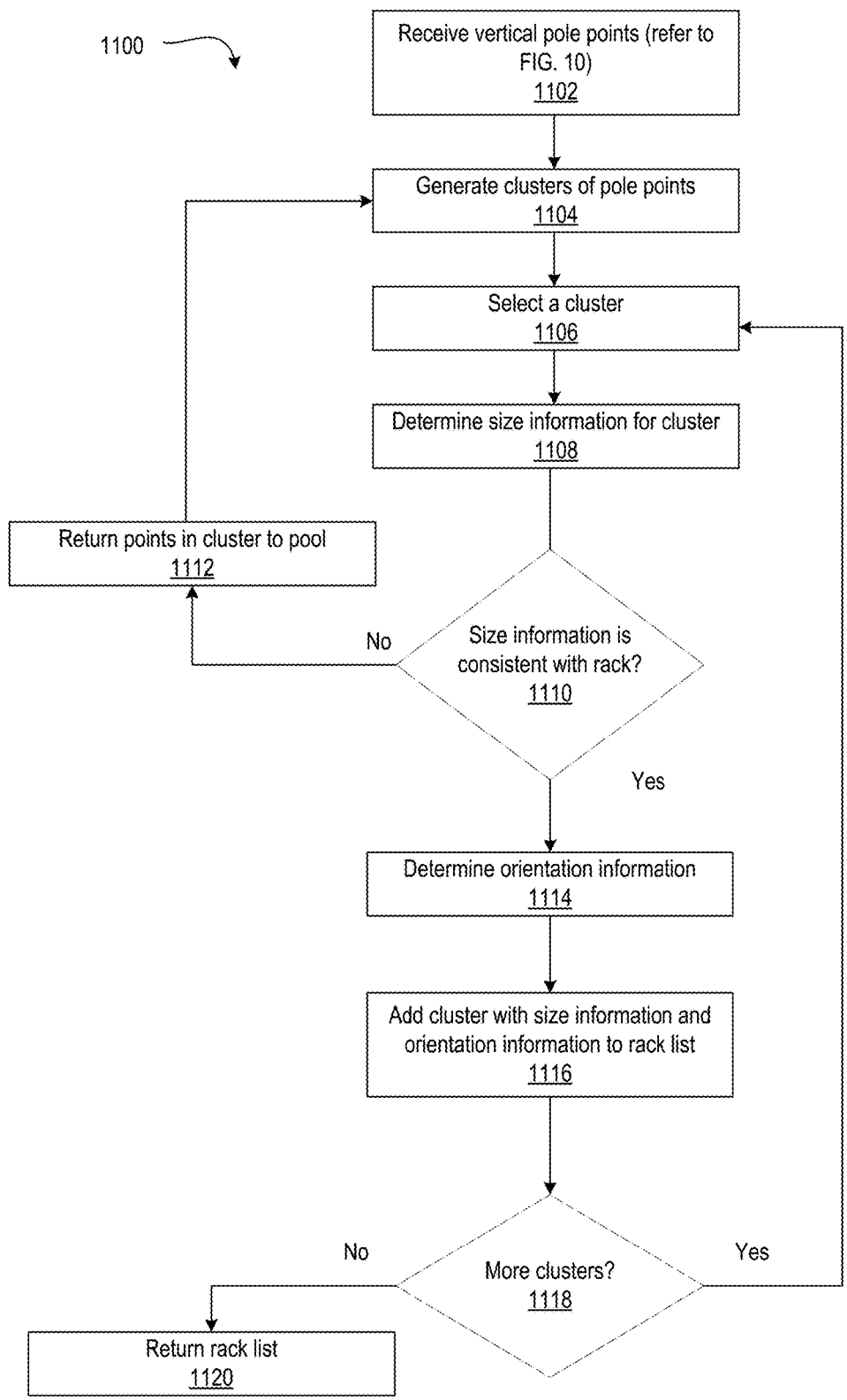
FIG. 11 is a flowchart of a process for clustering vertical poles into rack groupings.

FIG. 11 is a flowchart of a process 1100 for clustering vertical poles into groups of racks. Process 1100 can be performed by any computing device, such as the computer system 104 (refer to FIG. 1). The process 1100 depicted in FIG. 11 refers to step 714 in FIG. 7A. The computer system can implement an HDBSCAN and/or k-means clustering to identify groups of racks separated by aisles. Rack groups typically can have long-skinny bounding boxes used to identify an orientation of the racks. Moreover, the bounding boxes can typically contain two rows of racks. These racks can be of a same/different type depending on the requirements of the physical environment. As a result of the process in FIG. 11, there can be useful clustering results, making it easier and faster to identify racks before classifying the types of racks in the physical environment. In implementations where clustering is not as accurate in the process depicted in FIG. 11, this process can be repeated later on by the computer system by using classification information obtained from other processes described throughout this disclosure.

Referring to FIG. 11, the computer system receives vertical pole points (refer to FIG. 10) in step 1102. Clusters can be generated for those points, using techniques previously described (step 1104). The point cloud can be broken up into a predetermined number of maximum clusters. The computer system can select a cluster in step 1106. Next, the computer system can determine size information for the selected cluster in step 1108. This can include finding a bounding box for the selected cluster, identifying a minimum x, y, and z coordinate as well as a maximum x, y, and z coordinate for the bounding box. The computer system can identify a length of the bounding box, which can be the difference of the maximum x coordinate and the minimum x coordinate. The computer system can repeat these calculations for the length of the y coordinate as well. The computer system can also determine an aspect of the bounding box, wherein the computer system divides the length of the y coordinate by the length of the x coordinate. Once size information for the cluster is determined in step 1108, the computer system can determine whether the size information is consistent with rack information in step 1110. Rack information can be inputted into the computer system by a user at a computing device and/or any other type of computer/system in communication with the computer system performing the technique 1100. If the size information is not consistent with the rack information, then the computer system can return the points from the selected cluster to the pool of vertical pole points in step 1112. The computer system can then generate new clusters of pole points to determine whether a different cluster of points would be indicative of a rack grouping. Thus, the computer system can repeat the steps previously described.

Referring back to step 1110, if the computer system determines the size information is consistent with the rack information, then orientation information can be determined in step 1114 based on, for example, the bounding box in the sizing information. Therefore, rack groups will typically have long-skinny bounding boxes, which indicates a vertical orientation. Once orientation information is determined, the computer system can add the selected cluster along with its associated size information and orientation information to a rack list (step 1116). Then, the computer system can determine whether there are more clusters in step 1118. If there are, another cluster can be selected in step 1108 and the steps previously described can be repeated. If there are no more clusters, the computer system can return the rack list in step 1120. The list can be displayed and/or sent to a user computing device, a display, and/or any other device/computer/system in communication with the computer system performing the process 1100.

Figure 12:
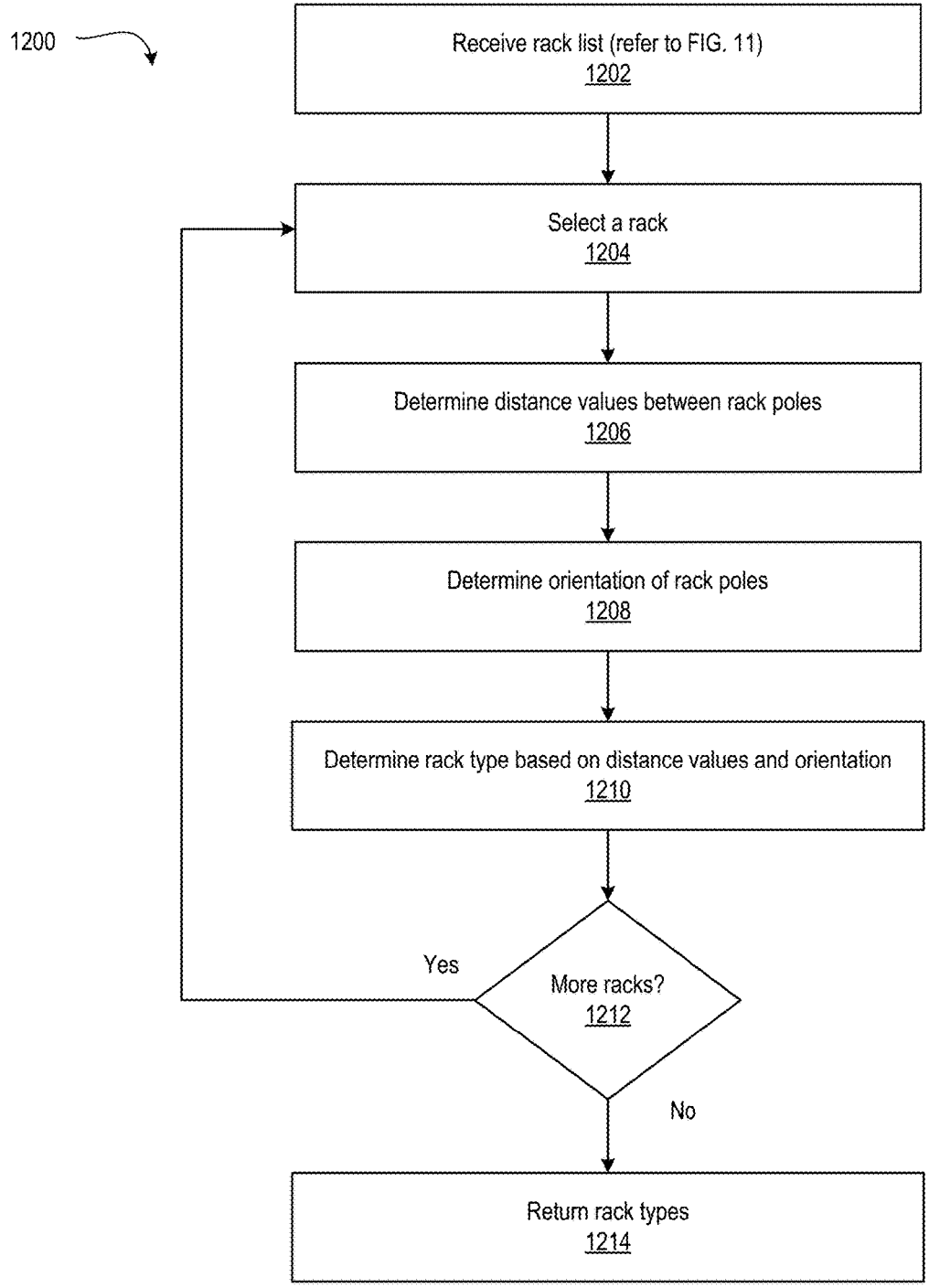
FIG. 12 is a flowchart of a process for classifying rack poles.

FIG. 12 is a flowchart of a process for classifying rack poles. Process 1200 can be performed by any computing device, such as the computer system 104 (refer to FIG. 1). The process 1200 depicted in FIG. 12 refers to step 716 in FIG. 7A. There are multiple types of racks that can be used in a physical environment. For example, a common type of rack is called a drive-in rack. This rack is commonly characterized by a 1.2 m×1.4 m vertical pole spacing pattern, made such that a forklift or other warehouse vehicle can drive into/under the rack to deposit/pick up a physical object/item. Another common type of rack is called a select rack. An orientation for each type of rack can be different. Some rack types can also have different angles. X and y distances to neighboring poles can contain information that can be matched to a rack specification to then identify what rack type is used. Moreover, a user at a device in communication with computer system can provide the computer system with rack specifications, such as what type of racks are in the warehouse environment and thus should be identified.

When good clustering results are obtained in previous processes, rack orientation information can be used in the process 1200 to decrease processing time. After all, the computer system can use/rely on only one orientation rather than both, in order to determine the types of racks used. In implementations where clustering results are not as good, the computer system can consider all orientations to classify the rack types.

The computer system can receive the rack list (refer to FIG. 11) in step 1202. A rack from the list can be selected in step 1204. Then, the computer system can determine distance values between each of the rack poles in the selected rack (step 1206). For example, nearest neighboring poles can be identified and then distances can be determined between each of the nearest neighbors and the poles in the selected rack. The computer system can also determine orientation information of the poles in the selected rack (step 1208). Next, a rack type can be determined based on the distance values and orientation information (step 1210). For example, greater distance values between poles can be indicative of a drive-in rack type, whereas smaller distance values between poles can be indicative of a select rack.

Once the rack type is determined in step 1210, the computer system can determine whether there are more racks in the rack list in step 1212. If there are, the computer system can select another rack from the list in step 1204 and repeat the steps previously described until there are no more racks in the list. If there are no more racks in step 1212, the computer system returns a list of rack types in step 1214. As discussed, the list can be displayed and/or sent to a user computing device, a display, and/or any other device/computer/system in communication with the computer system performing the process 1200.

Figure 13:
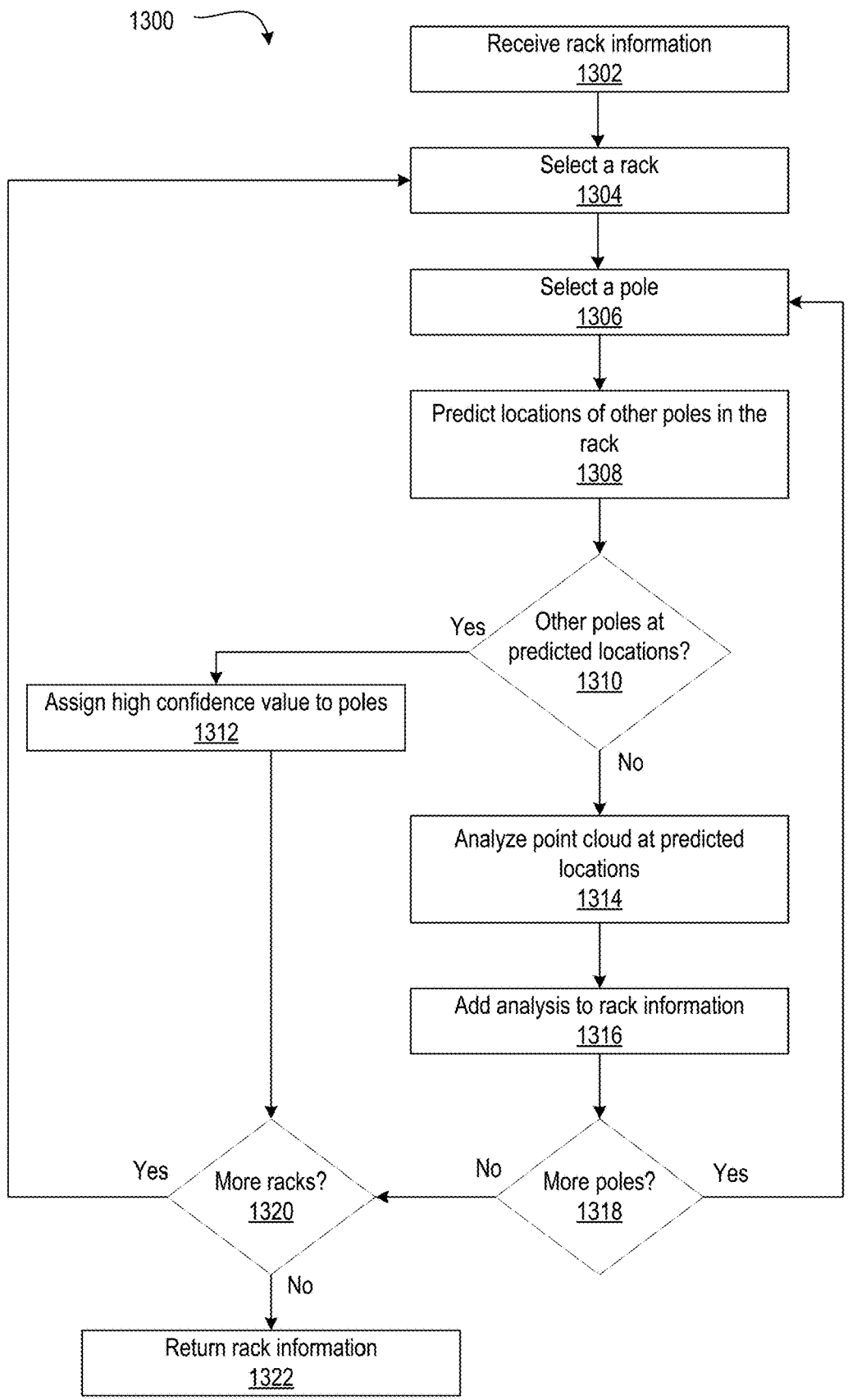
FIG. 13 is a flowchart of a process for interpolating missing rack poles.

FIG. 13 is a flowchart of a process 1300 for interpolating missing rack poles. Process 1300 can be performed by any computing device, such as the computer system 104 (refer to FIG. 1). The process 1300 depicted in FIG. 13 refers to step 718 in FIG. 7A. When there are a series of xy vertical rack pole locations and associated rack types and orientations, a computer system can look for missing pole locations that match the detected patterns. If new pole predictions are predicted, the computer system can look into the original point cloud at that location for a vertical pole. When a vertical pole is predicted based on a particular rack type and orientation, the predicted pole can inherit that type and orientation as well as the associated confidence scores.

Referring to FIG. 13, the computer system can receive rack information generated in the previously discussed processes (step 1302). This rack information can include but is not limited to poles, types of poles, orientations of each pole, and confidence scores. Next, in step 1304, a rack can be selected from the received rack information. Once the rack is selected, a pole comprising the rack can be selected (step 1306). The computer system can then, in step 1308, predict locations of other poles in the rack based off the location of the selected pole. In step 1310, the computer system can determine whether other poles are at the predicted locations. This can be accomplished by known techniques and in some implementations, the computer system can analyze the selected rack's information to identify the location of the other poles within that rack that the computer system did not select in step 1306. The computer system can also analyze all of the rack information received from step 1302 to determine whether any pole in that information falls within the predicted locations of other poles from step 1308.

If the computer system determines that other poles are at the predicted locations in step 1310, then a high confidence value can be assigned to the poles in the selected rack (step 1312). This indicates that the computer system accurately refined, filtered, and/or processed the point cloud to determine where vertical poles are in the environment, rack groupings, and rack types. If other poles are not at the predicted locations in step 1310, the computer system analyzes the point cloud at the predicted locations (step 1314). The computer system can get all of the data collected, received, and analyzed from previous processes to determine whether the computer system missed a pole that is in the point cloud and that should be considered part of the selected rack. Based on the computer system's determinations, the computer system can update/add its analysis to the rack information in step 1316. For example, if the computer system determines that there is in fact a pole at one of the predicted locations in the point cloud, the computer system can add information about that pole to the rack information. That way, when the computer system loops back through the process 1300 to either step 1304 or 1306, the newly added rack information can be analyzed and confidence value(s) can be adjusted accordingly.

The computer system can then determine whether there are more poles within the selected rack that need to be analyzed (step 1318). If there are more poles, the computer system returns to step 1306, and repeats the steps previously described. If there are no more poles, the computer system determines whether there are more racks in the rack information in step 1320. Additionally, referring back to step 1312, once the computer system assigns high confidence values to the poles, the computer system also goes to step 1320 and must determine whether there are more racks. If there are, the computer system returns to step 1304, and repeats the steps previously described. If no more racks are in the rack information, the computer system returns the rack information in step 1322. The rack information can include but is not limited to the updated high confidence values for the poles and/or analysis of whether a pole is not at one of the predicted locations but is supposed to be there. The rack information can be displayed and returned as previously discussed throughout this disclosure.

Figure 14A:
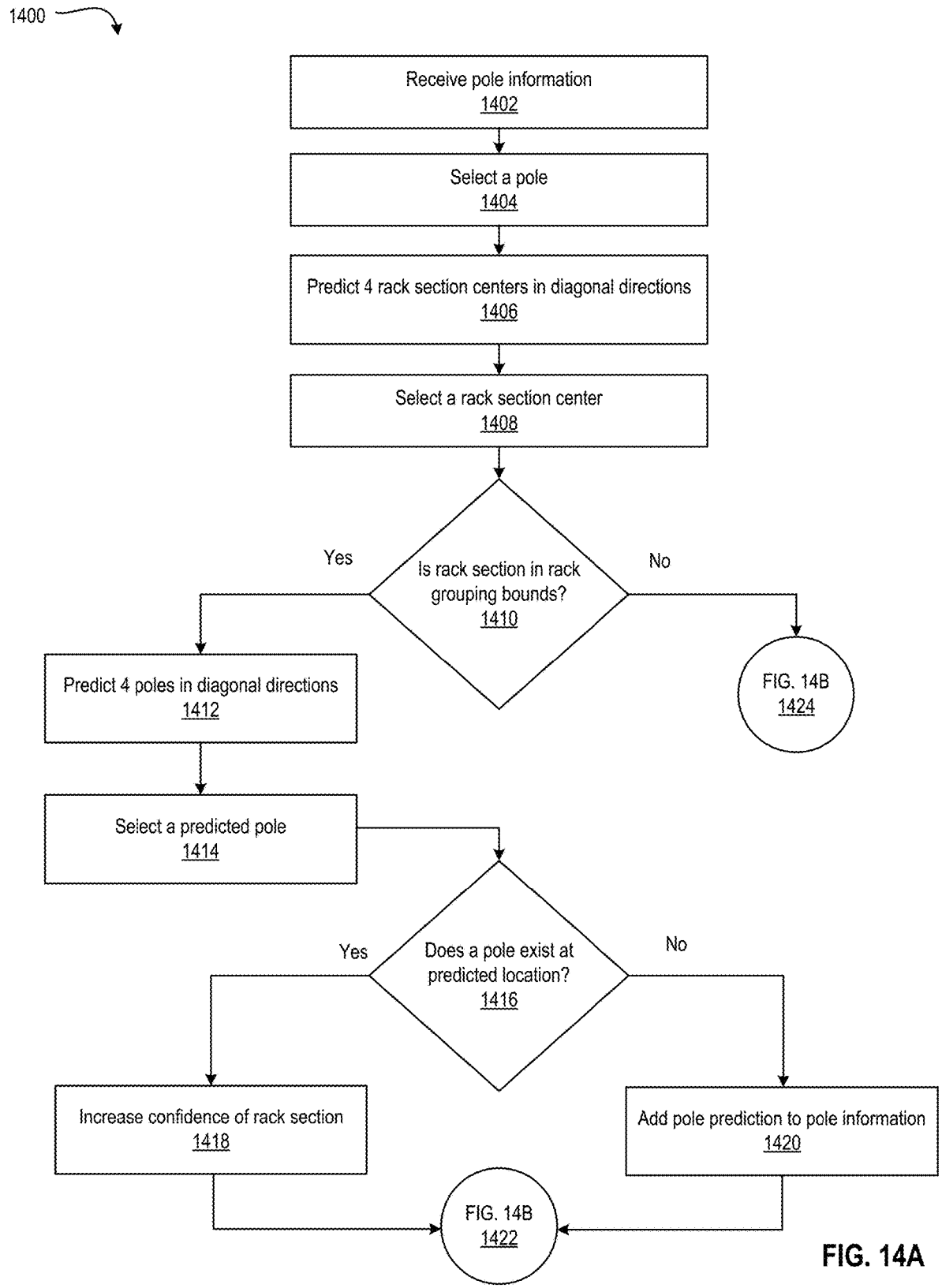
FIGS. 14A-B is a flowchart of a process for detecting rack sections.
Figure 14B:
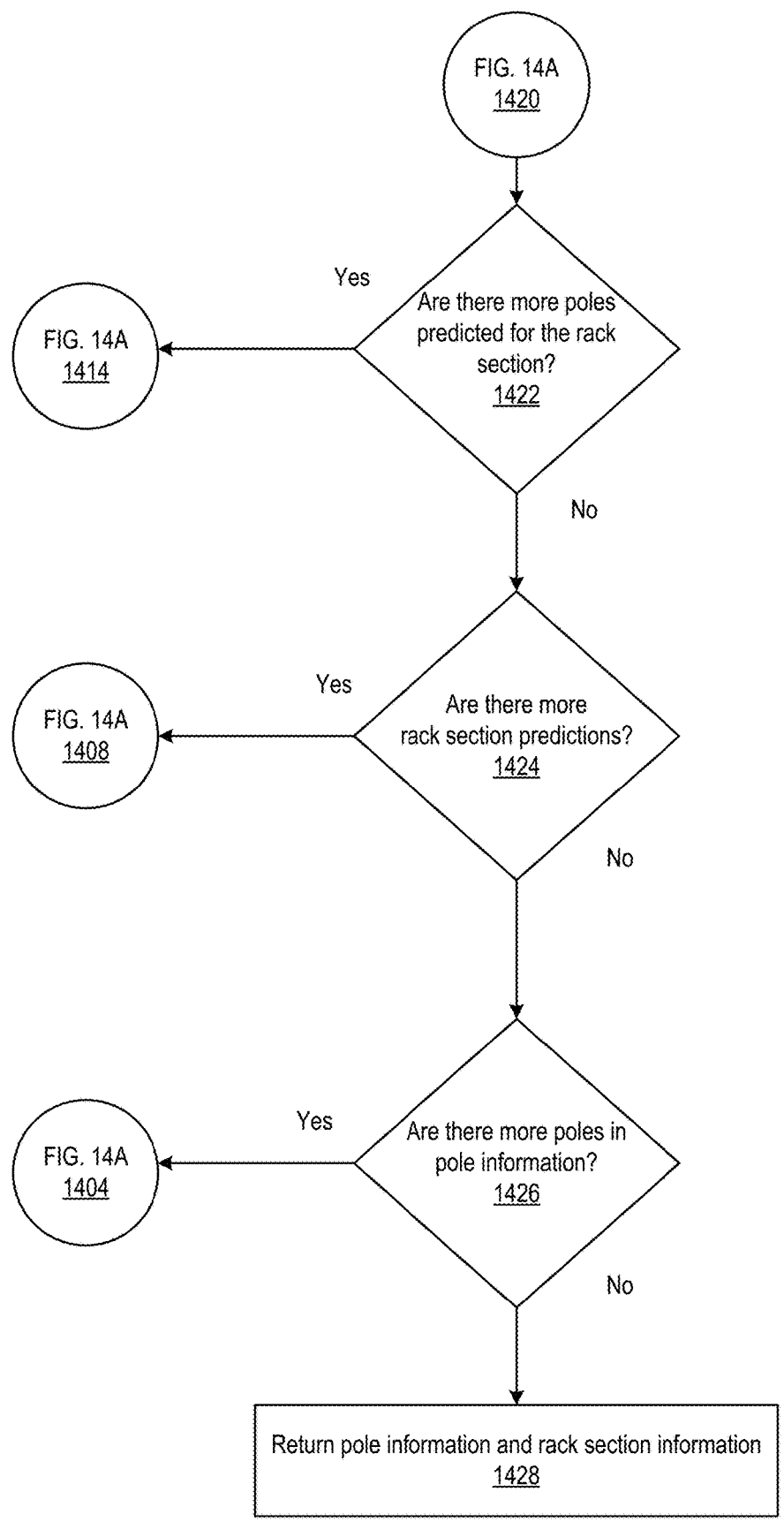

FIGS. 14A-B is a flowchart of a process 1400 for detecting rack sections in the vertical rack poles. Process 1400 can be performed by any computing device, such as the computer system 104 (refer to FIG. 1). The process 1400 depicted in both FIGS. 14A-B refers to step 720 in FIG. 7A. With location, rack type, and orientation information for each vertical pole, the computer system can identify sections of rack, wherein those sections can be made up of four neighboring poles of a same type and orientation. A rack section typically has a type, an orientation, and a location. In some implementations, for example, two adjacent rack sections can share two poles. This indicates that the two adjacent rack sections are part of a same rack. A group of racks, which can be separated by aisles, can consist of different types of racks, and may even consist of one rack, two racks, or many full racks. Additionally, vertical support poles running from a floor to a ceiling of the physical environment often can cause racks to be broken into several smaller racks. Therefore, the purpose of the process 1400 is to locate each rack section in a set of classified vertical poles and identify their rack type and orientation. Once rack section information is determined, pallet centers can be calculated (refer to FIG. 15).

Referring to the process 1400 in both FIGS. 14A-B, the computer system can receive pole information from the previous processes in step 1402 (refer to FIGS. 7-13). The received information can include but is not limited to pole locations, rack type, rack and pole orientation, confidence score(s), and pole groupings. In step 1404, a pole is selected from the pole information. Then, the computer system predicts locations of rack section centers in the four diagonal directions from the selected pole (step 1406). Therefore, rack section centers can be predicted along NW, NE, SW, and SE directions. Once rack section centers are predicted, a rack section center can be selected in step 1408.

In step 1410, the computer system can determine whether or not the selected rack section is within a bounding box of the rack grouping. If it is within bounds, then the computer system can continue to process the rack section in step 1412. If the rack section is not within bounds, then the computer system can skip ahead to step 1424. Once a rack section is selected and determined to be within the bounds of a rack grouping, the computer system can predict four pole locations, each in a diagonal direction (e.g., NW, NE, SW, and SE) from that rack section center (step 1412). The computer system can select a predicted pole location in step 1414. In step 1416, the computer system can determine whether or not a pole is located at the predicted location. This determination can be made using techniques previously discussed (refer to FIG. 13). If a pole is found at the predicted location, then a high confidence value is assigned for the rack section (step 1418). The high confidence value indicates that the poles are in fact part of a rack section accurately captured in the point cloud and refined by the previously discussed processes.

If the computer system determines there is no pole at the predicted location in step 1416, the predicted pole location can be added to the pole information in step 1420. Once completed with either step 1418 or 1420, the computer system can determine whether there are more predicted pole locations to be analyzed for this rack section prediction (step 1422). If there are, the computer system can return to step 1414 and repeat the steps previously described. If there are no more pole predictions to be analyzed for this rack section, then the computer system can determine if there are more rack section predictions to be analyzed (step 1424). If there are, the computer system can return to step 1408 and repeat the steps previously described.

If there are no more rack section predictions to analyze, the computer system determines whether there are more poles in the pole information in step 1426. If there are, the computer system returns to step 1404 and repeats the steps previously described. If there are no more poles in the pole information, the computer system returns the pole information pole information and rack section information in step 1428. The rack section information can include but is not limited to the locations and confidence scores of the predicted rack section centers, the rack section orientations, and the rack section types. The pole information can include but is not limited to the predicted locations of other poles. The rack section and pole information can be displayed and returned as previously discussed throughout this disclosure.

Figure 15:
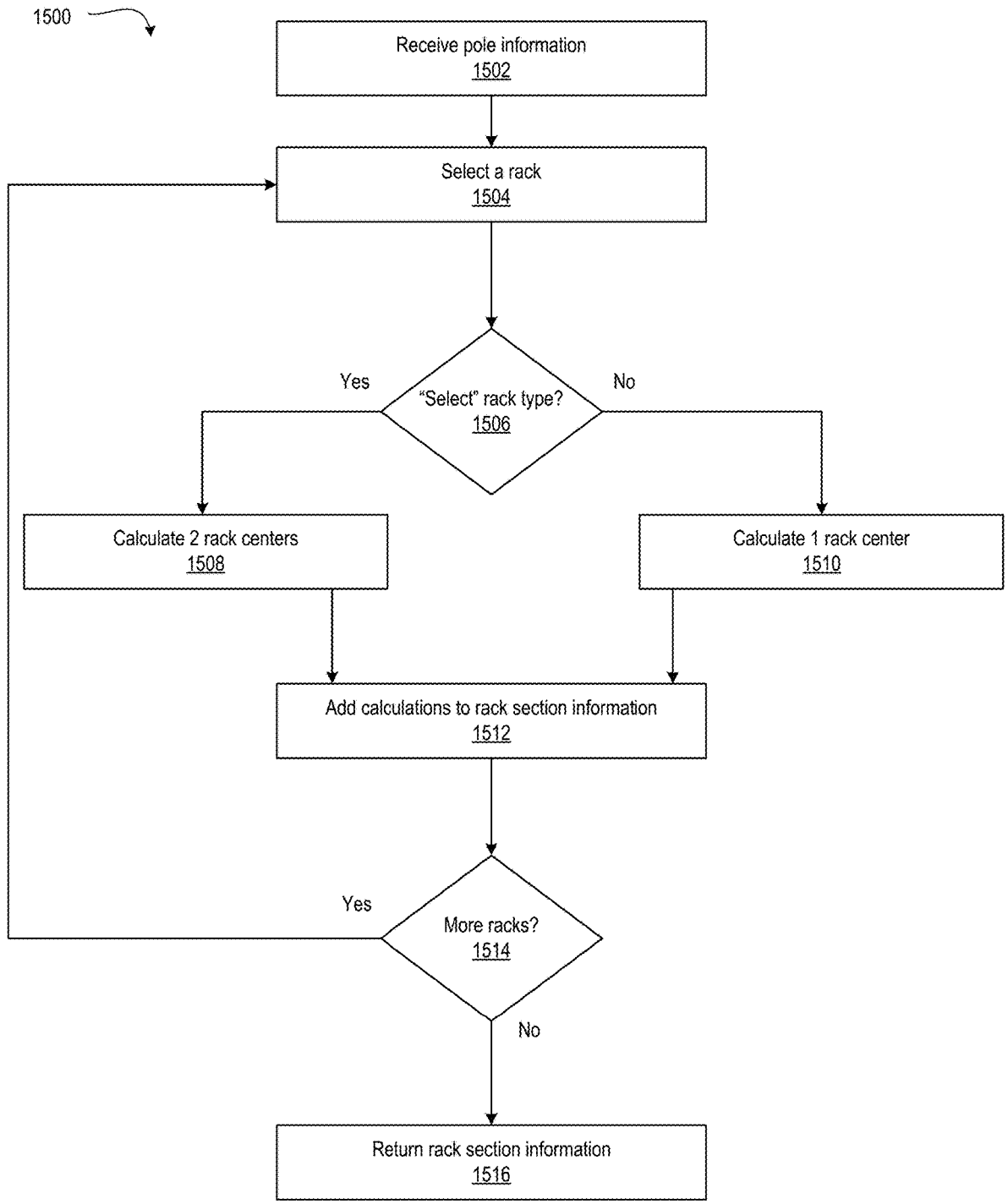
FIG. 15 is a flowchart of a process for calculating pallet footprint locations.

FIG. 15 is a flowchart of a process 1500 for calculating pallet footprint locations. Process 1500 can be performed by any computing device, such as the computer system 104 (refer to FIG. 1). The process 1500 depicted in FIG. 15 refers to step 724 in FIG. 7B. The amount of pallets held in racks depends on the type of racks utilized in the physical environment and a number of shelves on each rack. For example, select rack locations can typically hold two pallets side-by-side in each rack section. On the other hand, drive-in rack locations can typically hold one pallet. Regardless of how many pallets are held by rack type, the same algorithm/technique can be used to calculate a list of pallet footprint centers once rack locations are known.

Referring to FIG. 15, the computer system can receive rack section information from previous processes (refer to FIGS. 7-14) (step 1502). The rack section information can include but is not limited to rack section locations, rack types, rack and/or pole orientation, and rack and/or pole groupings. The computer system can then select a rack section in step 1504. The computer system can then determine whether the selected rack has a rack type of "select" (step 1506). If the rack section has a select rack type, then the computer system can calculate two pallet footprint centers in the rack section in step 1510. If the rack type is not "select," then it is most likely a single-wide type of rack, such as a "drive-in" rack, and a single pallet footprint location can be calculated at the center of the rack section. Known techniques can be used for calculated centers of the racks. In step 1510, the computer system can also calculate a pallet direction, using known techniques as well, as the rack grouping's bounds and type.

Once calculations are completed in either step 1508 or 1510, the computer system can add such calculation(s) to the rack section information in step 1512. Once the rack section information is updated, the computer system can determine whether there are more rack sections in the rack section information in step 1514. If there are, the computer system can return to step 1504 in the process 1500 and repeat the steps previously described. If there are no more rack sections in the rack section information, the computer system can return the rack section information in step 1516. The rack section information can include but is not limited to the rack center calculation(s), pallet footprint prediction(s), and/or pallet direction(s). The rack section information can be displayed and returned in a manner similar to the pole information as previously discussed throughout this disclosure.

Figure 16:
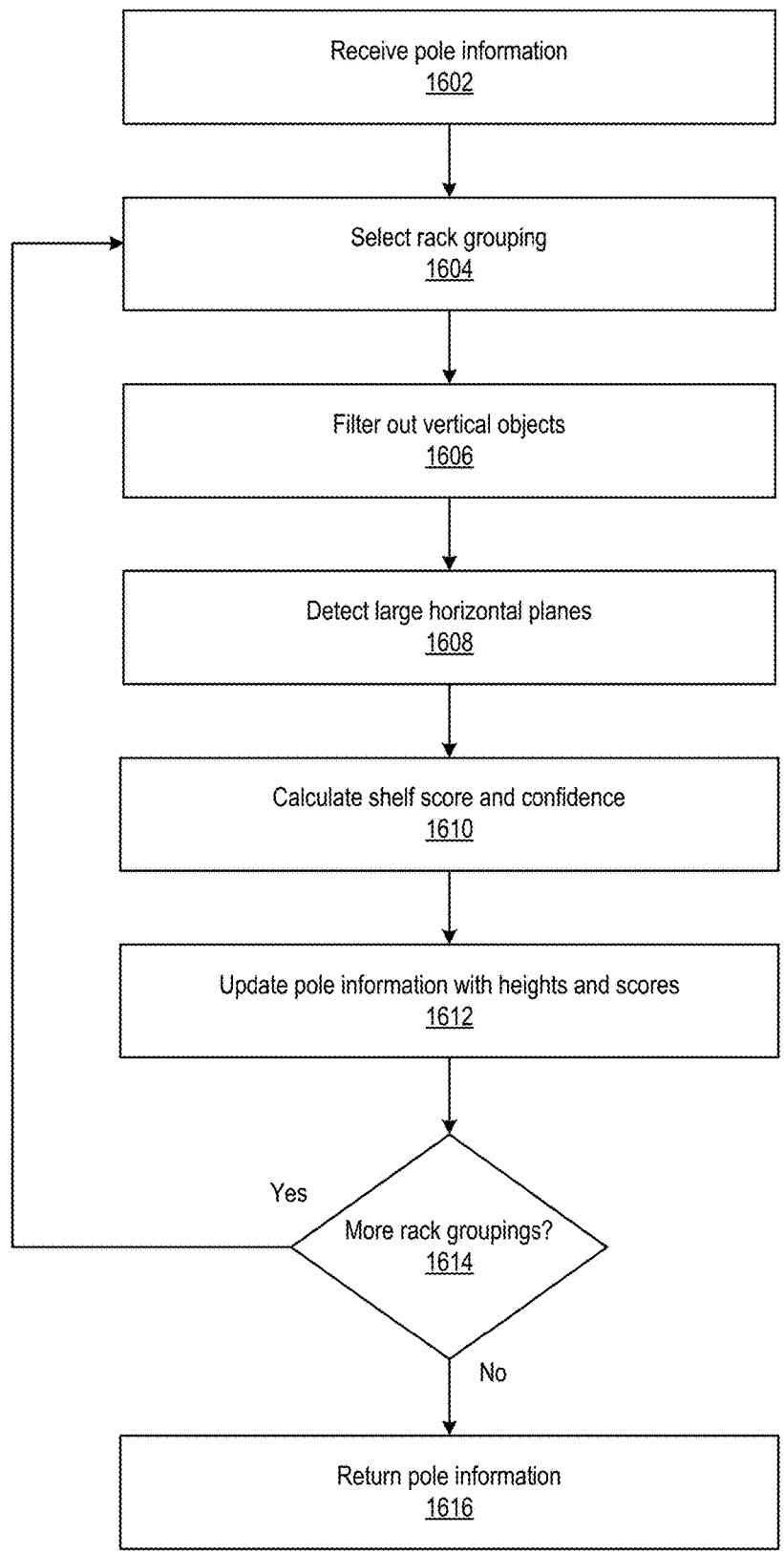
FIG. 16 is a flowchart of a process for locating rack shelves for rack sections.

FIG. 16 is a flowchart of a process 1600 for locating rack shelves for rack sections. Specifically, heights of the shelves can be determined in order to know how many pallets the rack can hold and where the pallets are located in space. Process 1600 can be performed by any computing device, such as the computer system 104 (refer to FIG. 1). The process 1600 depicted in FIG. 16 refers to step 726 in FIG. 7B.

Referring to FIG. 16, the computer system can receive pole information from previous processes (refer to FIGS. 7-14) (step 1602). The pole information can include but is not limited to pole locations, rack types, rack and/or pole orientation, and rack and/or pole groupings. The computer system can then select a rack grouping in step 1604.

The computer system can filter out all vertical objects from the rack data, such as vertical poles or vertical planes that make up pallet faces (step 1606). In step 1608, the computer system can locate large horizontal planes through known techniques. These large horizontal planes can contain information about heights of the shelves on the rack.

Once the computer system has identified several large, horizontal planes, it can go through a scoring process of the planes using known clustering and classification algorithms to determine whether each plane has characteristics of a shelf or if each plane looks more like tops of pallets (step 1610). This scoring process can reveal information about confidence of predicted shelf heights, which can be useful in later computations. The Calculated shelf scores and confidences can therefore be stored in a remote data store or other data storage system.

In step 1612, the computer system can update the pole information with the identified shelf heights. In step 1614, the computer system can determine whether or not there are more rack groupings to be analyzed. If there are more rack groupings, the computer system can return to step 1604 and repeat the steps described above. If there are no more rack groupings, then the computer system can return the updated pole information in step 1616. The pole information can include but is not limited to the newly predicted shelf heights and confidence scores. The pole information can be displayed and returned in a manner similar to the pole information as previously discussed throughout this disclosure.

Figure 17:
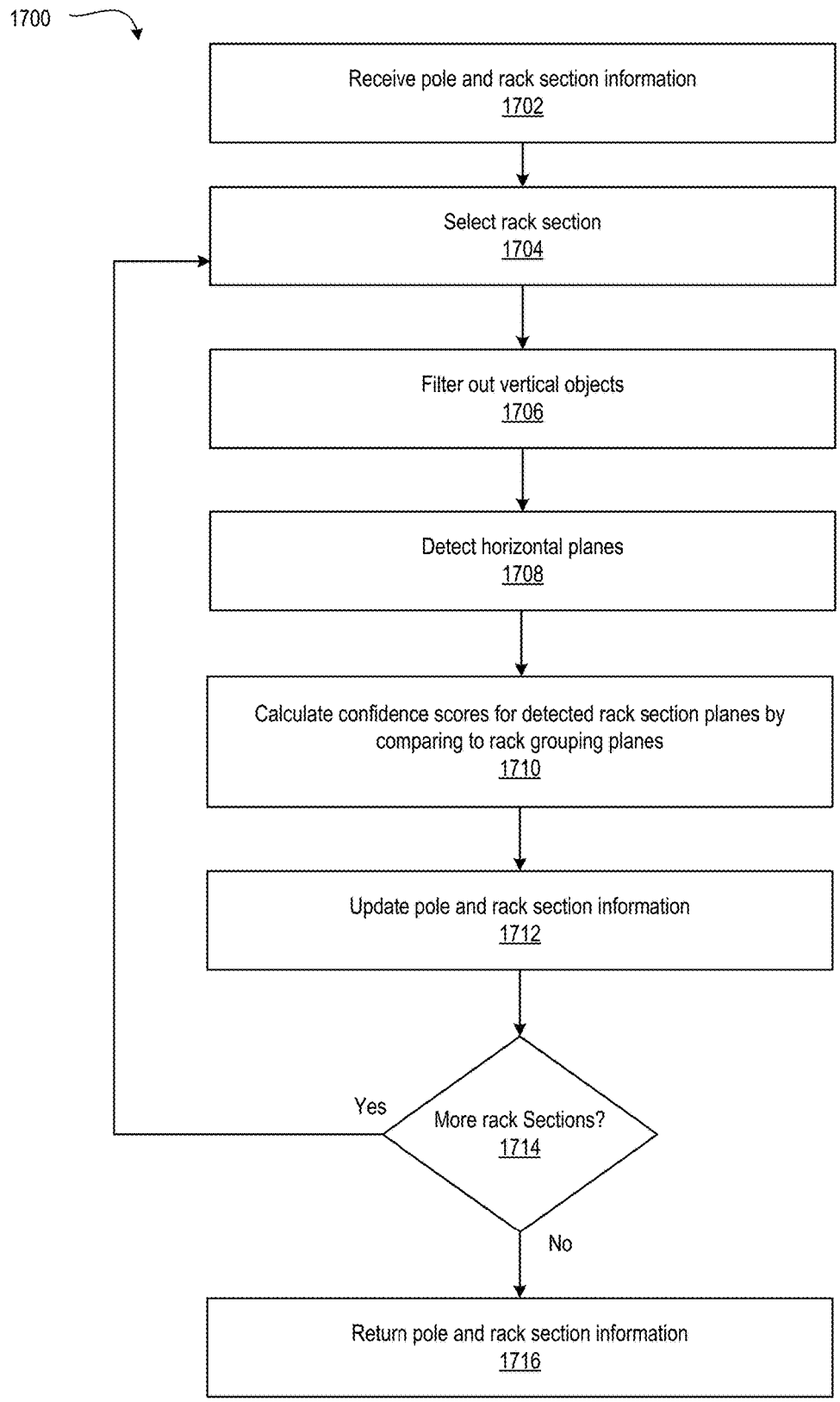
FIG. 17 is a flowchart of a process for detecting rack section and pallet level heights.

FIG. 17 is a flowchart of a process 1700 for detecting rack section and pallet level heights. In other words, the process 1700 can be used for locating rack shelves for individual rack sections. Process 1700 can be performed by any computing device, such as the computer system 104 (refer to FIG. 1). The process 1700 depicted in FIG. 17 refers to step 728 in FIG. 7B. In the process 1700, actual heights of individual pallets can be located. Locating the actual heights can be beneficial because a rack may have several different shelf levels that do not stay constant along an entire length of the rack.

Referring to FIG. 17, the computer system can receive pole and rack section information from previous processes (refer to FIGS. 7-16) (step 1702). The pole information can include but is not limited to rack types, rack and/or pole orientation, and rack and/or pole groupings. The rack section information can include but is not limited to rack section locations, pallet footprint locations, rack section types, and rack section orientations. The computer system can select a rack section in step 1704.

The computer system can then filter out all vertical objects from the rack data, such as vertical poles or vertical planes that make up pallet faces (step 1706). In step 1708, the computer system can locate horizontal planes through known techniques. These horizontal planes can contain information about the heights of the shelves on the rack.

In step 1710, the computer system can calculate confidence scores for the detected rack section planes. The confidence scores can be calculated based on comparing the heights of these rack section shelves to the rack heights found in the process 1600. The detected rack section planes can be compared to the rack grouping planes. If the height information of this rack section is consistent with the overall rack level height information for the rack, then the pallet heights can be scored with a high confidence score. A high confidence score can be near 1 while a low confidence score can be near 0. If a pallet height is found in step 1710 that is not consistent with any rack heights identified in technique 1600, then this prediction can have a low confidence score, unless it can be verified through some other algorithm or by a user.

In step 1712, the computer system can update the pole and rack section information with the identified shelf heights. The information can also be updated with the confidence scores. In step 1714, the computer system can determine whether or not there are more rack sections to be analyzed in the rack section information. If there are, then the computer system can return to step 1704. If there are no more rack sections, then the computer system can return the updated pole and rack section information. The pole and rack section information can include but is not limited to the newly predicted shelf heights and confidence scores for individual poles and individual pallet locations, respectively. The pole and rack section information can be displayed and returned in a manner similar to the pole information as previously discussed throughout this disclosure.

While this specification contains many specific implementation details, these should not be construed as limitations on the scope of the disclosed technology or of what may be claimed, but rather as descriptions of features that may be specific to particular embodiments of particular disclosed technologies. Certain features that are described in this specification in the context of separate embodiments can also be implemented in combination in a single embodiment in part or in whole. Conversely, various features that are described in the context of a single embodiment can also be implemented in multiple embodiments separately or in any suitable subcombination. Moreover, although features may be described herein as acting in certain combinations and/or initially claimed as such, one or more features from a claimed combination can in some cases be excised from the combination, and the claimed combination may be directed to a subcombination or variation of a subcombination. Similarly, while operations may be described in a particular order, this should not be understood as requiring that such operations be performed in the particular order or in sequential order, or that all operations be performed, to achieve desirable results. Particular embodiments of the subject matter have been described. Other embodiments are within the scope of the following claims.

What is claimed is:

1. A method for generating a mapping of a physical space from point cloud data for the physical space, the method comprising:
   receiving, by a computing system, the point cloud data for the physical space, the point cloud data including a plurality of points in three-dimensional space that approximate locations of physical surfaces within the physical space;
   filtering, by the computing system, the point cloud data to, at least, remove sparse points from the point cloud data;
   aligning, by the computing system, the point cloud data along x, y, and z dimensions that correspond to an orientation of the physical space;
   classifying, by the computing system, the points in the point cloud data as corresponding to one or more types of physical surfaces;
   identifying, by the computing system, specific physical structures in the physical space based, at least in part, on classifications for the points in the point cloud data;
   generating, by the computing system, the mapping of the physical space to identify the specific physical structures and corresponding contours for the specific physical structures within the orientation of the physical space;
   detecting, by the computing system and from the point cloud data, physical objects in the physical space; and
   determining, by the computing system, characteristics of the detected physical objects in the physical space,
   wherein detecting, by the computing system, the physical objects in the physical space comprises:
      classifying points in the point cloud data that are associated with contours related to the physical objects,
      localizing the classified points, and
      straightening the localized points into the physical objects, and
   wherein classifying, by the computing system, points in the point cloud data that are associated with the physical objects comprises:
      voxelizing the point cloud data into first predetermined mesh sizes,
      for each voxel, clustering points of the point cloud data in the voxel,
      for each cluster of points in the voxel, voxelizing the cluster of points into second predetermined mesh sizes,
      for each point in each voxelized cluster of points, classifying the point as an object point,
      for each cluster of points in the voxel, normalizing the classifications for each point, and
      determining, based on the normalizing the classifications for each point, whether each cluster of points in the voxel is associated with the physical objects in the physical space.

2. The method of claim 1, wherein classifying, by the computing system, the points in the point cloud data comprises:
   selecting, from the point cloud data, a reference point;
   identifying, for the reference point, k nearest neighbor points;
   calculating, for each of the k nearest neighbor points, spherical coordinates with respect to the reference point;
   determining, based on the spherical coordinates for each of the k nearest neighbor points, spherical features of the reference point; and
   classifying, based on determining the spherical features of the reference point, the reference point, wherein the reference point can be classified as belonging to at least one of a floor, a wall, a vertical pole, a support beam, a pallet, and noise.

3. The method of claim 2, wherein classifying, by the computing system, the points in the point cloud data further comprises outputting at least one of (i) classifications for each of the points in the point cloud data, (ii) spherical features for each of the points in the point cloud data, and (iii) objects that are represented by the point cloud data based on the classifications for each of the points in the point cloud data.

4. The method of claim 1, wherein aligning, by the computing system, the point cloud data comprises identifying one or more reference points around at least one of a door or a window in the physical space, wherein the one or more reference points indicate an axis on which to rotate the point cloud data.

5. The method of claim 1, wherein aligning, by the computing system, the point cloud data comprises detecting a bounding box around the physical space, wherein the bounding box indicates an axis on which to rotate the point cloud data.

6. The method of claim 1, wherein:
detecting, by the computing system and from the point cloud data, physical objects in the physical space comprises:
detecting, by the computing system and from the point cloud data, vertical poles, and
determining, by the computing system, characteristics of the detected physical objects in the physical space comprises:
detecting, by the computing system and from the point cloud data based on the detected vertical poles, rack sections;
determining, by the computing system, pallet footprints based on the detected rack sections;
determining, by the computing system, heights of each shelf section in the detected rack sections; and
identifying, by the computing system, pallet locations for each shelf section of the detected rack sections based on the pallet footprints and the heights of each shelf section.

7. The method of claim 6, wherein detecting, by the computing system, vertical poles comprises:
classifying points in the point cloud data that are associated with vertical poles;
localizing the classified points; and
straightening the localized points into vertical poles.

8. The method of claim 7, wherein detecting, by the computing system, rack sections comprises:
clustering the vertical poles into rack groupings;
classifying the clustered vertical poles with a rack type and a rack orientation;
interpolating missing rack poles for each of the clustered vertical poles based on the classifying the clustered vertical poles with a rack type and a rack orientation; and
detecting rack sections based on the clustered vertical poles.

9. The method of claim 8, wherein clustering, by the computing system, the vertical poles into rack groupings comprises:
receiving rack information;
for each cluster, determining size information of the cluster, wherein the size information includes a bounding box, minimum x, Y, and Z coordinates of the bounding box, and maximum X, Y, and Z coordinates of the bounding box;
determining whether the size information of the cluster is consistent with the rank information;
returning, based on determining that the size information of the cluster is not consistent with the rack information, points in the cluster to a pool of points in the point cloud data;
identifying, based on determining that the size information of the cluster is consistent with the rack information, orientation information of the cluster; and
generating a rack list containing the cluster, the size information of the cluster, and the orientation information of the cluster.

10. The method of claim 9, further comprising:
selecting, by the computing system, a rack from the rack list;
determining, by the computing system, distances between each of the vertical poles in the selected rack;
determining, by the computing system, orientation information for each of the vertical poles in the selected rack; and
determining, by the computing system, a rack type of the selected rack based on the distances and the orientation information for each of the vertical poles.

11. The method of claim 7, wherein classifying, by the computing system, points in the point cloud data that are associated with vertical poles comprises:
voxelizing the point cloud data into first predetermined mesh sizes;
for each voxel, clustering points of the point cloud data in the voxel;
for each cluster of points in the voxel, voxelizing the cluster of points into second predetermined mesh sizes;
for each point in each voxelized cluster of points, classifying the point as a vertical pole point;
for each cluster of points in the voxel, normalizing the classifications for each point; and
determining, based on the normalizing the classifications for each point, whether each cluster of points in the voxel is associated with vertical poles.

12. The method of claim 11, wherein for each point in each voxelized cluster of points, classifying, by the computing system, the point as a vertical pole point comprises:
applying a covariance matrix to the voxelized cluster of points;
determining standard deviation values for each point in the voxelized cluster of points;
identifying a high standard deviation in a Z direction;
identifying a low standard deviation in X and Y directions; and
assigning, for each point in the voxelized cluster of points and based on the identified high standard deviation and the identified low standard deviation, a score for one dimensional or two dimensional points extension to the point.

13. The method of claim 11, wherein for each point in each voxelized cluster of points, classifying, by the computing system, the point as a vertical pole point comprises applying a spherical covariance matric to the voxelized cluster of points.

14. The method of claim 11, wherein for each point in each voxelized cluster of points, classifying, by the computing system, the point as a vertical pole point comprises applying a histogram filter to the voxelized cluster of points.

15. The method of claim 11, wherein for each point in each voxelized cluster of points, classifying, by the computing system, the point as a vertical pole point comprises applying a neural network to the voxelized cluster of points.

16. The method of claim 6, wherein determining, by the computing system, pallet footprints based on the detected rack sections comprises:
for each of the detected rack sections, determining whether the detected rack section has a select rack type;

calculating, based on determining that the detected rack section has the select rack type, two pallet footprint centers in the detected rack section; and calculating, based on determining that the detected rack section does not have the select rack type, one pallet footprint center in the detected rack section.

17. The method of claim 6, wherein determining, by the computing system, heights of each shelf section in the detected rack sections comprises:

for each of the detected rack sections, filtering out vertical objects from the detected rack section;

detecting horizontal planes in the filtered rack section;

identifying whether the horizontal planes have characteristics of a shelf section;

determining a high shelf score based on determining that the horizontal planes have characteristics of the shelf section; and determining a low shelf score relative to the high shelf score based on determining that the horizontal planes do not have characteristics of the shelf section, wherein the low shelf score is closer to 0 and the high shelf score is closer to 1.

18. A computerized system for generating a mapping of a physical space from point cloud data for the physical space, the system comprising:

one or more processors; and one or more computer-readable devices including instructions that, when executed by the one or more processors, cause the computerized system to perform operations that include:

receiving the point cloud data for the physical space, the point cloud data including a plurality of points in three-dimensional space that approximate locations of physical surfaces within the physical space;

filtering the point cloud data to, at least, remove sparse points from the point cloud data;

aligning the point cloud data along x, y, and z dimensions that correspond to an orientation of the physical space;

classifying the points in the point cloud data as corresponding to one or more types of physical surfaces;

identifying specific physical structures in the physical space based, at least in part, on classifications for the points in the point cloud data;

generating the mapping of the physical space to identify the specific physical structures and corresponding contours for the specific physical structures within the orientation of the physical space;

detecting, from the point cloud data, physical objects in the physical space; and determining characteristics of the detected physical objects in the physical space, wherein detecting the physical objects in the physical space comprises:

classifying points in the point cloud data that are associated with contours related to the physical objects, localizing the classified points, and straightening the localized points into the physical objects, and wherein classifying, by the computing system, points in the point cloud data that are associated with the physical objects comprises:

voxelizing the point cloud data into first predetermined mesh sizes, for each voxel, clustering points of the point cloud data in the voxel, for each cluster of points in the voxel, voxelizing the cluster of points into second predetermined mesh sizes, for each point in each voxelized cluster of points, classifying the point as an object point, for each cluster of points in the voxel, normalizing the classifications for each point, and determining, based on the normalizing the classifications for each point, whether each cluster of points in the voxel is associated with the physical objects in the physical space.

19. The system of claim 18, wherein classifying the points in the point cloud data comprises:

selecting, from the point cloud data, a reference point;

identifying, for the reference point, k nearest neighbor points;

calculating, for each of the k nearest neighbor points, spherical coordinates with respect to the reference point;

determining, based on the spherical coordinates for each of the k nearest neighbor points, spherical features of the reference point; and classifying, based on determining the spherical features of the reference point, the reference point, wherein the reference point can be classified as belonging to at least one of a floor, a wall, a vertical pole, a support beam, a pallet, and noise.

20. The system of claim 19, wherein classifying the points in the point cloud data further comprises outputting at least one of (i) classifications for each of the points in the point cloud data, (ii) spherical features for each of the points in the point cloud data, and (iii) objects that are represented by the point cloud data based on the classifications for each of the points in the point cloud data.

* * * * *

UNITED STATES PATENT AND TRADEMARK OFFICE
CERTIFICATE OF CORRECTION

PATENT NO. : 11,734,883 B2
APPLICATION NO. : 17/230651
DATED : August 22, 2023
INVENTOR(S) : Christopher Frank Eckman and Brady Michael Lowe It is certified that error appears in the above-identified patent and that said Letters Patent is hereby corrected as shown below:

In the Claims

In Column 27, Line 59, in Claim 9, delete "minimum x" and insert -- minimum X --, therefor.

In Column 27, Line 63, in Claim 9, delete "rank" and insert -- rack --, therefor.

Signed and Sealed this
Twenty-sixth Day of December, 2023

*Katherine Kelly Vidal*

Katherine Kelly Vidal
*Director of the United States Patent and Trademark Office*